United States Patent
Chen

(10) Patent No.: US 11,264,026 B2
(45) Date of Patent: Mar. 1, 2022

(54) METHOD, SYSTEM, AND DEVICE FOR INTERFACING WITH A TERMINAL WITH A PLURALITY OF RESPONSE MODES

(71) Applicant: BANMA ZHIXING NETWORK (HONGKONG) CO., LIMITED, Kowloon (HK)

(72) Inventor: Liang Chen, Shanghai (CN)

(73) Assignee: BANMA ZHIXING NETWORK (HONGKONG) CO., LIMITED, Hong Kong (HK)

(*) Notice: Subject to any disclaimer, the term of this patent is extended or adjusted under 35 U.S.C. 154(b) by 80 days.

(21) Appl. No.: 16/549,808

(22) Filed: Aug. 23, 2019

(65) Prior Publication Data

US 2020/0075006 A1  Mar. 5, 2020

(30) Foreign Application Priority Data

Aug. 29, 2018 (CN) .......................... 201810997884.0

(51) Int. Cl.
| | | |
|---|---|---|
| *G10L 15/00* | (2013.01) | |
| *G10L 15/22* | (2006.01) | |
| *B60W 50/10* | (2012.01) | |
| *G10L 13/00* | (2006.01) | |
| *G10L 15/26* | (2006.01) | |
| *G10L 17/00* | (2013.01) | |

(52) U.S. Cl.
CPC ............ *G10L 15/22* (2013.01); *B60W 50/10* (2013.01); *G10L 13/00* (2013.01); *G10L 15/26* (2013.01); *G10L 17/00* (2013.01); *G10L 2015/227* (2013.01)

(58) Field of Classification Search
CPC ......... G10L 15/22; G06F 3/167; G06F 40/35; B60R 16/0373
See application file for complete search history.

(56) References Cited

U.S. PATENT DOCUMENTS

| 8,140,335 | B2 | 3/2012 | Kennewick | |
|---|---|---|---|---|
| 8,346,563 | B1* | 1/2013 | Hjelm | ................ G10L 15/1822 |
| | | | | 704/275 |
| 9,493,130 | B2 | 11/2016 | Penilla | |
| 9,997,069 | B2 | 6/2018 | Bennett | |
| 10,116,748 | B2 | 10/2018 | Farmer | |
| 10,410,250 | B2 | 9/2019 | Singhal | |
| 2003/0167167 | A1* | 9/2003 | Gong | ...................... G10L 15/22 |
| | | | | 704/250 |
| 2006/0229873 | A1* | 10/2006 | Eide | ........................ G10L 15/22 |
| | | | | 704/260 |
| 2009/0055178 | A1* | 2/2009 | Coon | ...................... G10L 17/00 |
| | | | | 704/246 |

(Continued)

*Primary Examiner* — Daniel Abebe
(74) *Attorney, Agent, or Firm* — Van Pelt, Yi & James LLP

(57) ABSTRACT

The present application discloses a method, device, and system for interfacing with a terminal with a plurality of response modes. The method includes obtaining a voice command from a user, determining context information corresponding to the voice command, and performing a response operation in response to the voice command, the response operation being based at least in part on a response mode that is determined based at least in part on the context information, and the response mode indicating one or more interfaces for interaction between the terminal and the user.

22 Claims, 10 Drawing Sheets

(56) References Cited

U.S. PATENT DOCUMENTS

| | | | |
|---|---|---|---|
| 2009/0150156 A1* | 6/2009 | Kennewick | G10L 15/00 |
| | | | 704/257 |
| 2012/0022872 A1* | 1/2012 | Gruber | G06F 3/167 |
| | | | 704/270.1 |
| 2012/0290972 A1 | 11/2012 | Yook | |
| 2013/0096921 A1* | 4/2013 | Kuwamoto | G08G 1/0962 |
| | | | 704/260 |
| 2013/0275875 A1 | 10/2013 | Gruber | |
| 2014/0082501 A1* | 3/2014 | Bae | G06F 3/167 |
| | | | 715/728 |
| 2014/0136013 A1 | 5/2014 | Wolverton et al. | |
| 2018/0211663 A1 | 7/2018 | Shin et al. | |
| 2018/0262834 A1* | 9/2018 | Cho | G06F 3/167 |
| 2019/0095050 A1 | 3/2019 | Gruber | |
| 2019/0102146 A1* | 4/2019 | Swift | G10L 15/22 |
| 2019/0303095 A1* | 10/2019 | Sohoni | G10L 15/22 |

\* cited by examiner

METHOD, SYSTEM, AND DEVICE FOR INTERFACING WITH A TERMINAL WITH A PLURALITY OF RESPONSE MODES

CROSS REFERENCE TO OTHER APPLICATIONS

This application claims priority to People's Republic of China Patent Application No. 201810997884.0 entitled INTERACTION METHOD, DEVICE, MEDIUM AND OPERATING SYSTEM filed Aug. 29, 2018 which is incorporated herein by reference for all purposes.

FIELD OF THE INVENTION

The present invention relates to a field of Internet technology. In particular, the present application relates to an interaction method, device, system, medium, and operating system.

BACKGROUND OF THE INVENTION

Integrated automobile travel among the user, the vehicle, and contextual information such as user preferences or user needs has become a mainstream mode of travel. During transit, various user needs or preferences may arise while the user is operating the vehicle. Needs and preferences that can arise during vehicle operation can pertain to navigation information, weather information, information on nearby gas stations, and music playback. Various types of assistant-type applications (apps) have been developed in order to facilitate addressing needs of the user during vehicle operation to provide improved driving convenience and comfort while at the same time taking into account user driving safety. Such assistant-type apps are integrated into the vehicle and/or the user's (e.g., the driver's) mobile terminal. The assistant-type apps can be provided via an interface such as Android® Auto, Apple® CarPlay, etc.

Users in a vehicle, whether the driver or someone else (e.g., a passenger), can use an app through a voice interaction. In response to voice commands output by a user in the vehicle, the app engages in multiple interactions with the user in speech and interface modes and outputs response information.

If any user in the vehicle uses the app, the app interacts with the user according to a uniform response processing logic. Such a uniform response processing logic limits user operating convenience and lacks flexibility and specificity.

BRIEF DESCRIPTION OF THE DRAWINGS

Various embodiments of the invention are disclosed in the following detailed description and the accompanying drawings.

In order to provide a clearer explanation of the technical solutions in embodiments of the present application or in the prior art, a simple introduction is given below to the drawings which are needed to describe the embodiments or the prior art. Obviously, the drawings in the description below are some embodiments of the present invention. Persons with ordinary skill in the art could, without expending creative effort, obtain other drawings on the basis of these drawings

DETAILED DESCRIPTION

Figure 1:
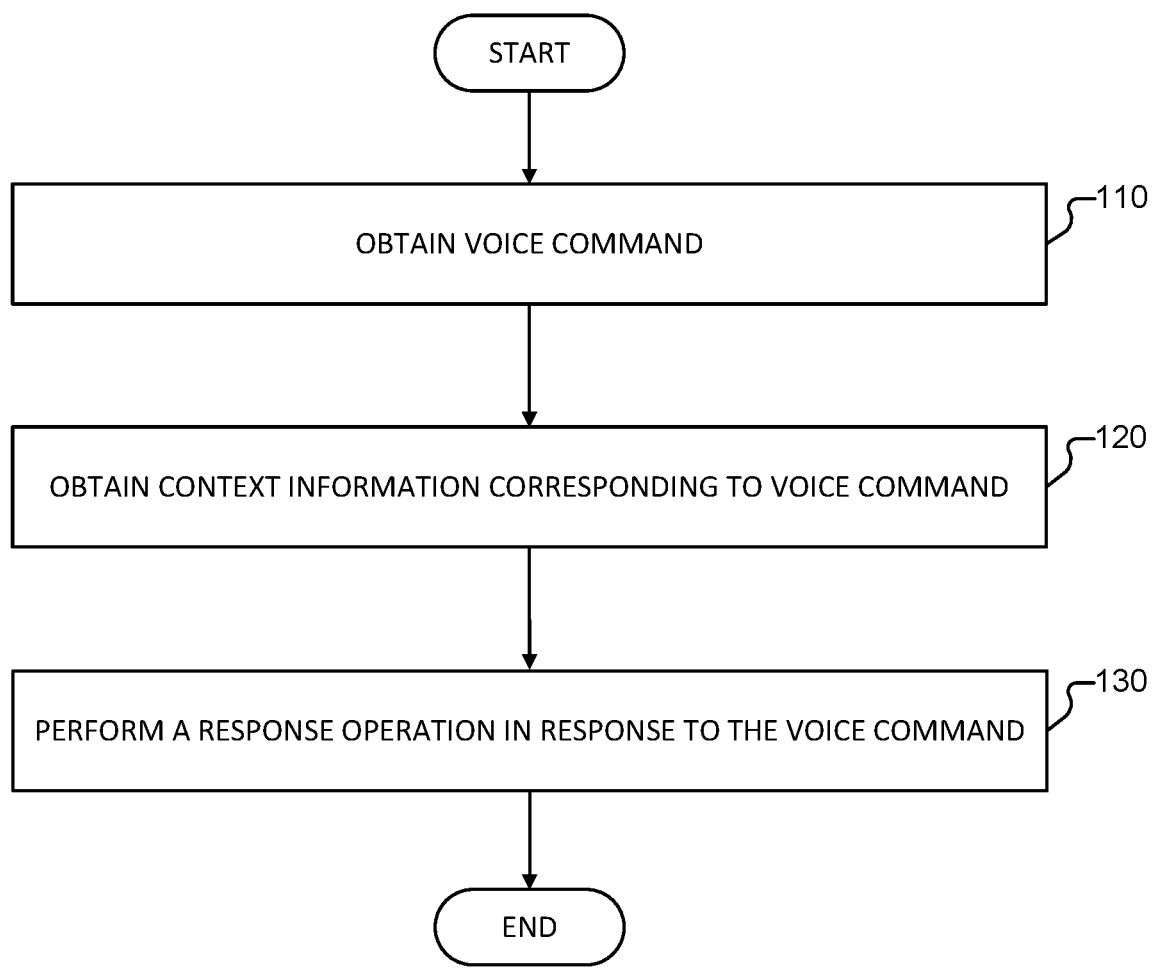
FIG. 1 is a flowchart of a method for interacting with a terminal according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Exemplary embodiments are explained in detail here, and examples thereof are shown in the drawings. When the following descriptions relate to the drawings, the same numbers in different drawings indicate the same or similar elements, except where otherwise indicated. Implementations described in the exemplary embodiments below do not represent all implementations consistent with one or more embodiments of this specification. Rather, the implementations described in the exemplary embodiments are merely examples of means and methods that are described in detail in the claims and that are consistent with some aspects of one or more embodiments of this specification.

Please note that, in other embodiments, the corresponding method steps will not necessarily be executed according to the sequence depicted and described in the present specification. The steps included in the methods of some other embodiments may be more or fewer than what are described in the present specification. In addition, a single step described in the present specification may be described as split apart into multiple steps in other embodiments, and multiple steps described in the present specification may be described as combined into a single step in other embodiments.

The terms used in embodiments of the present invention merely serve to describe specific embodiments and are not intended to restrict the present invention. "A," "said," and "the" or "this" as used in their singular form in embodiments of the present invention and the claims also are intended to encompass the plural form, unless otherwise clearly indicated by the context. "Multiple" generally encompasses at least two.

Please note that the term "and/or" used herein is merely a relationship describing related objects. It may indicate three kinds of relationships. For example, A and/or B may indicate the three situations of: only A exists, A and B both exist, and only B exists. In addition, the symbol "/" herein generally expresses an "or" relationship between the preceding and following objects.

Depending on context, the word "if" when used herein may be interpreted as "when" or "upon" or "in response to the determination that" or "in response to the detection of." Depending on the context, the phrase "upon determining" or "upon detecting (a stated condition or event)" may be understood as "when it is determined" or "in response to the determination that" or "upon detecting (a stated condition or event)" or "in response to the detection of (a stated condition or event)."

Please also note that the term "comprise" or "contain" or any of their variants are to be taken in their non-exclusive sense. Thus, products or systems that comprise a series of elements not only comprise those elements, but also comprise other elements that have not been explicitly listed or elements that are intrinsic to such products or systems. In the absence of further limitations, elements that are limited by the phrase "comprises a(n) . . . " do not exclude the existence of additional identical elements in products or systems that comprise said elements.

In addition, the sequence of steps in each of the method embodiments described below is merely an example and does not impose strict limits.

As used herein, a "terminal" generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, a vehicle operating system, a vehicle, or the like. A terminal can run various operating systems.

The term "vehicle" referred to herein includes, but is not limited to: internal combustion engine automobiles or motorcycles, electric automobiles or motorcycles, electric bicycles, Segways, remote-controlled vehicles, small aircraft (e.g., unmanned aerial vehicles, manned small aircraft, and remote-controlled aircraft), autonomous automobiles, and variations thereof. Correspondingly, on-board input devices, on-board processors, and on-board output devices in a vehicle refer to the relevant input devices, processors, and output devices carried in the corresponding means of transportation. In other words, "on-board" may simply be understood as meaning "carried in a vehicle."

According to various embodiments, a method, system, device, and/or vehicle that provide(s) interaction for a user is implemented in connection with a vehicle. For example, a vehicle can implement an interface or a method for interaction with a user thereof (e.g., a driver, operator, or passenger of the vehicle). An interaction method performed in connection with a vehicle can be executed by an on-board device in the vehicle. As an example, the on-board device can be a car driving recorder, a vehicle-mounted information/entertainment system, a center console, a navigation device, or any combination thereof. The on-board device can include an on-board input device such as a speech transceiver, an on-board processor, and an on-board output device such as a display screen or a speaker.

FIG. 1 is a flowchart of a method for interacting with a terminal according to various embodiments of the present application.

Referring to FIG. 1, process 100 for interacting with a terminal is provided. Process 100 can be implemented in connection with process 200 of FIG. 2, process 300 of FIG. 3, process 400 of FIG. 4, process 500 of FIG. 5, process 600 of FIG. 6, and/or process 700 of FIG. 7. Process 100 can implement execution process 800 of FIG. 8. Process 100 can be implemented at least in part by operating system 900 of FIG. 9 and/or computer system 1000 of FIG. 10.

According to various embodiments, process 100 is implemented by an operating system or an application running on an electronic device such as an on-board device. For example, process 100 is implemented in connection with a vehicle. For example, process 100 can provide a method for interacting with a terminal, such as a vehicle.

At 110, a voice command is obtained. In some embodiments, the voice command is obtained by one or more microphones, etc. that are connected to a terminal such as a computer in the vehicle. The voice command can be obtained by a mobile terminal that is connected to the vehicle (e.g., via Bluetooth, USB, etc.) and the voice command can be provided by the mobile terminal to the vehicle (e.g., a computer operating the vehicle, a vehicle console, etc.). In response to receiving the voice command, the voice command can be converted to text information. For example, speech-to-text processing is performed with respect to the voice command to obtain text information corresponding to the voice command. Digital signal processing can be performed on the voice command before the speech-to-text processing in order to remove or reduce noise in the information corresponding to the voice command.

At 120, context information is obtained. In some embodiments, context information, which pertains to a context in which the voice command is input or in which a response to the voice command is to be provided, is determined. The vehicle (e.g., a computer operating the vehicle, a vehicle console, etc.) can determine the context information. In some embodiments, the context information is determined based at least in part on the voice command. In some embodiments, the context information is determined based on a context of the vehicle in relation to external environmental conditions (e.g., driving conditions, weather, etc.) and/or a vehicle status information such as information pertaining to a context of a vehicle (e.g., vehicle speed, a source of voice commands, a type of input to the vehicle etc.) and/or context of a terminal connected to the vehicle (e.g., a mobile terminal wirelessly connected to the vehicle, and/or a context of the terminal of the vehicle). As an example, a context of a terminal can correspond to operating conditions, currently executed applications (apps) running on the terminal, background apps or processes running on the terminal, user preferences and/or settings, administrative settings, etc., or any combination thereof. The context information can pertain to an app running on the terminal being provided by the terminal at the time the voice command is obtained, a menu being provided by the terminal at the time the voice command is obtained, etc.

At 130, a response operation is performed. In some embodiments, in response to obtaining the voice command and/or obtaining the context information, the vehicle (e.g., a terminal of the vehicle such as a console of the vehicle) performs a response operation. In some embodiments, the response operation comprises adopting a mode corresponding to the context information. The response operation can include performing one or more functions such as one or more functions that are responsive to the voice command. In some embodiments, the response operation comprises adopting a mode corresponding to the context information (e.g., a response mode), and thereafter performing one or more functions such as one or more functions that are responsive to the voice command. The response operation can comprise providing information to the user such as via a graphical user interface, or a voice response. The information provided to the user is based at least in part on the voice command and/or the context information corresponding to the voice command. In some embodiments, the response operation comprises setting or modifying one or more characteristics of the vehicle.

In some embodiments, the response operation includes performing a voice interaction with a user in response to a user voice command. The voice interaction performed can be a service and can be referred to herein as a response object. Response modes and/or response operations can be configured based at least in part on the context information such as the context information corresponding to the voice command. For example, in connection with performing a response operation, the response operation can be configured to correspond to one or more of a plurality of response modes based at least in part on context information (e.g., context information pertaining to the voice command). Configuring the response operation based on the application context in which the response operation is applied or in which the voice command is obtained provides the user with a targeted service in the application context. In some embodiments, the response object is configured based at least in part on the context information. The response object can be configured according to one or more response modes based at least in part on a corresponding context.

In some embodiments, the response object is determined based at least in part on the context information corresponding to the voice command. The response object can perform one or more response operations corresponding to the voice command (e.g., one or more response operations determined to be responsive to the voice command). As an example, the response object is an application (app). The app can be installed in an on-board device in a vehicle, in which case the application context corresponding to the response object can be a vehicle (e.g., a family car). As another example, the response object is control software used in connection with an electronic device (e.g., control software in a smart television set).

The context information corresponding to the voice command can pertain to various contexts. For example, various types of context information can be associated with different application contexts in which the voice command is obtained or that a response operation is to be performed (e.g., in response to a voice command). Context information can be characterized according to one or more context characteristics. The one or more characteristics that can characterize the context information can include a source of voice command and device status information. The device refers to a device corresponding to the response object (e.g., the on-board device or smart television in the examples given above), or a device that obtains the voice command.

In some embodiments, determination of the context information is based at least in part on the source of the voice command. The context information can be based at least in part on the source of the voice command without being based on a device status information. As an example, the context information can be based solely on the source of the voice command. The context information can be based solely on the source of the voice command. In some embodiments, the context information is based on the source of the voice command without being based on the device status information in contexts according to which different voice command sources correspond to different response modes (e.g., in cases where a voice command source can be mapped to a single response mode).

In some embodiments, determination of the context information is based at least in part on the device status information. The context information can be based at least in part on the device status information without being based on a source of the voice command. As an example, the context information can be based solely on the device status information. The context information can be based solely on the source of the voice command. In some embodiments, the context information is based on the source of the voice command without being based on the device status information in contexts according to which differences in device status information correspond to different response modes (e.g., in cases when a device status information can be mapped to a single response mode).

In some embodiments, context information is determined based at least in part on both voice command source and device status information. For example, different combinations of voice command source and device status information can correspond to different response modes.

As an example, in the case of a smart television, context information can comprise the distance of the user from the smart television set, and the differences in response mode can be differences in the size of the display font (e.g., various response modes correspond to different display font sizes). Correspondences can be set between different distances and different font sizes. For example, a mapping of distances to font sizes can be stored and used with respect to determining a response mode. If the distance of the user from the smart television is determined to be relatively small (e.g., the distance is less than one or more predefined thresholds), the corresponding font size can be relatively smaller (e.g., size A). If the distance of the user from the smart television is determined to be relatively large (e.g., the distance is more than one or more predefined thresholds), the font size can be relatively larger (e.g., size B, which is greater than size A). In some embodiments, the mapping of distances to font sizes is based at least in part on the user of the smart television, settings of the smart television, etc. For example, a user can have a profile or settings and/or preferences according to which user-specific mappings of distances to font sizes are associated (and used in connection with determining a response mode).

Therefore, in the example of the smart television, in response to the smart television receiving a voice command which is used by a particular user and that corresponds to switching to a certain channel or to turning on the television, the distance between the user that triggered the voice command and the smart television can be obtained. For example, the distance between the user and the smart television can be determined based on a preset distance-measuring method. If the distance between the user and the smart television is determined to be less than a threshold value, the font size of the text displayed on the smart television set screen is adjusted to font size A. If the distance between the user and the smart television is determined to be greater than a threshold value, the font size of the text displayed on the smart television set screen is adjusted to font size B.

In the example of the application context with respect to the smart television, different types of context information can be mapped to different users issuing the voice command, and/or the different response modes can be mapped to differences in font size. In some embodiments, the response modes are configured based at least in part on one or more characteristics associated with the user inputting the voice command and/or operating the smart television. For example, the response modes can be configured in a manner such that relatively older users and users that are children correspond to large font sizes, while the users of an average age (e.g., an average adult) correspond to a smaller font size. In some embodiments, in response to receiving a voice command (e.g., input by a user), a user identity is determined. As an example, the user identity is determined based on the voiceprint features of the voice command. As another example, the user identity is determined based at least in part on determining a user profile currently logged into the smart television. Other methods for determining the user identity are possible such as a visual identity, a user input or selection of a user identity (e.g., selection of a user profile, etc.), etc. In response to determining the user identity corresponding to the voice command, the response mode corresponding to the user identity is determined and/or selected and used in connection with responding to the voice command (e.g., in connection with performing a response operation).

According to various embodiments, a response object performs a voice interaction with a user in response to a user voice command and thus provides the user with a service. The one or more response operations performed in response to the input of the voice command can be determined based at least in part on context information pertaining to the voice command and/or the terminal at a time at which the voice command is input. For example, the one or more response operations can be determined based at least in part on a user (e.g., a user identity or one or more characteristics associated with the user) that input the voice command. The response modes corresponding to different types of context information can be configured based at least in part on the application contexts in which the response object is applied and/or the application contexts in which the one or more response operations are to be performed. In response to obtaining a voice command input by a user, the context information corresponding to the voice command is determined and based at least in part on the context information, a response mode for responding to the voice command is determined, and the terminal is configured according to the response mode (e.g., the terminal is set to the response mode) to respond to the voice command. Accordingly, the user is provided with a targeted service (e.g., in response to the input of a voice command).

An example of a vehicle application context is used below in connection with FIG. 2 to describe the process of interacting with a terminal in a vehicle context. According to various embodiments, context information in the application context can comprise one or more of: user identity, travel speed of the vehicle, position of the user in the vehicle, information being displayed on one or more interfaces of the car such as a menu type, etc.

Figure 2:
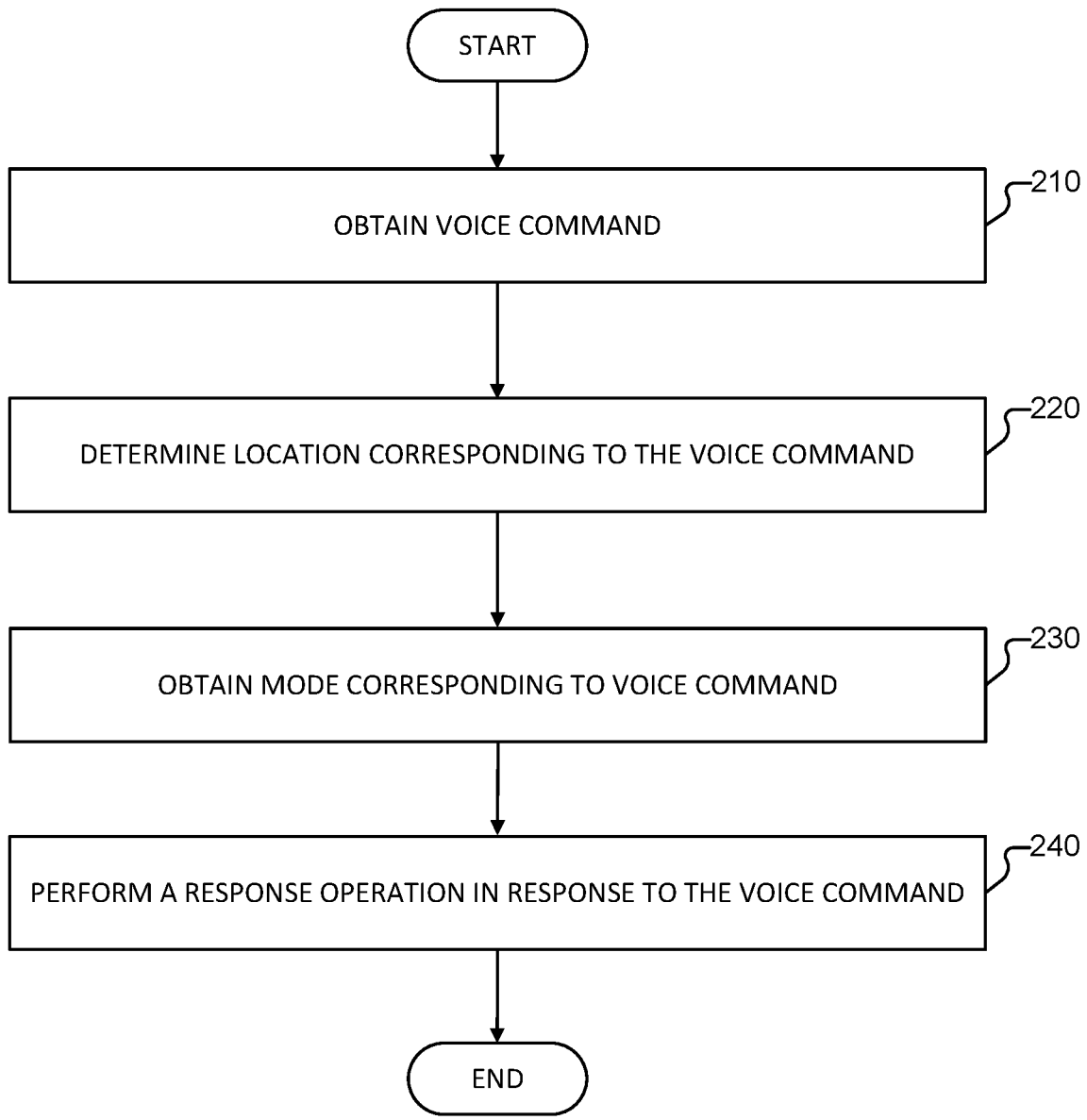
FIG. 2 is a flowchart of a method for interacting with a terminal according to various embodiments of the present application.

FIG. 2 is a flowchart of a method for interacting with a terminal according to various embodiments of the present application.

Referring to FIG. 2, process 200 for interacting with a terminal is provided. Process 200 can be implemented in connection with process 100 of FIG. 1, process 300 of FIG. 3, process 400 of FIG. 4, process 500 of FIG. 5, process 600 of FIG. 6, and/or process 700 of FIG. 7. Process 200 can implement execution process 800 of FIG. 8. Process 200 can be implemented at least in part by operating system 900 of FIG. 9 and/or computer system 1000 of FIG. 10.

According to various embodiments, process 200 is provided in a vehicle application context. Process 200 can be performed at least in part by an on-board device in the vehicle.

At 210, a voice command is obtained. In some embodiments, the voice command is obtained by one or more microphones, etc. that are connected to a terminal such as the vehicle. The voice command can be obtained by a mobile terminal that is connected to the vehicle (e.g., via Bluetooth, USB, etc.) and the voice command can be provided by the mobile terminal to the vehicle (e.g., a computer operating the vehicle, a vehicle console, etc.). In response to receiving the voice command, the voice command can be converted to text information. For example, speech-to-text processing is performed with respect to the voice command to obtain text information corresponding to the voice command. Digital signal processing can be performed on the voice command before the speech-to-text processing in order to remove or reduce noise in the information corresponding to the voice command.

At 220, a location corresponding to the voice command is obtained. In some embodiments, the terminal determines the location corresponding to the voice command. As an example, the location corresponding to the voice command is the relative location from which the voice command is input (e.g., the location at which the user speaks the voice command) in relation to one or more sensors in the terminal. As another example, the location corresponding to the voice command is an absolute location from which the voice command is input (e.g., the backseat of a vehicle, the passenger seat of a vehicle, etc.). In some embodiments, the terminal determines the location corresponding to the voice command based at least in part on a digital signal processing of the signal corresponding to the voice command. As an example, the location corresponding to the voice command is determined based at least in part on a volume of the voice command. As an example, the location corresponding to the voice command is determined based at least in part on a comparative analysis of using a plurality of inputs corresponding to the voice command, the plurality of voice inputs being respectively received at different sensors such as microphones connected to the terminal (e.g., based on known triangulation techniques to compute the location).

At 230, a mode corresponding to the voice command is determined. In some embodiments, the terminal (e.g., a console or computer of a vehicle) determines the mode corresponding to the voice command. The mode corresponding to the voice command can be determined based at least in part on the location corresponding to the voice command. For example, the mode corresponding to the voice command is determined based at least in part on the position of the source of the voice command. The mode corresponding to the voice command can be determined based at least in part on the position of the source of the voice command and context information pertaining to an operating context of the vehicle (e.g., driving conditions, vehicle settings, vehicle speeds, information or menus being displayed on a console of the vehicle, etc.). A mode corresponding to the voice command corresponds to a process or mechanism by which the terminal interfaces with a user (e.g., passenger(s) of the vehicle). The mode can define the input/output interface(s) by which the terminal interfaces with a user, such as receiving inputs via touch and/or voice inputs, and providing an output via a display on a screen or via a voice output.

According to various embodiments, the mode corresponding to the voice command is determined based at least in part on a mapping of locations corresponding to the voice command to modes. For example, the terminal uses the determined location corresponding to the voice command in connection with performing a look up in the mapping to determine the mode corresponding to the location corresponding to the voice command.

The mode corresponding to the voice command can be included in the response mode of process 100 (e.g., the mode determined to correspond to the context information).

At 240, a response operation is performed. In some embodiments, in response to obtaining the voice command and/or determining the mode, the terminal (e.g., a terminal of the vehicle such as a console of the vehicle) performs a response operation. In some embodiments, the response operation comprises adopting a mode corresponding to the location corresponding to the voice command and/or context information. The response operation can include performing one or more functions such as one or more functions that are responsive to the voice command. In some embodiments, the response operation comprises adopting a mode corresponding to the location corresponding to the voice command and/or context information (e.g., a response mode), and thereafter performing one or more functions such as one or more functions that are responsive to the voice command. The response operation can comprise providing information to the user such as via a graphical user interface, or a voice response. The information provided to the user is based at least in part on the voice command and/or the context information corresponding to the voice command. In some embodiments, the response operation comprises setting or modifying one or more characteristics of the vehicle. The performing the response operation can comprise performing one or more further interactions with a user (e.g., to refine and/or further narrow the response option desired by the user).

A car is used as an example of a vehicle for the purpose of illustration. A center console, which serves as the on-board device of a vehicle, is generally located between a driver seat and the front passenger seat. For example, the center console is provided on the dashboard between the driver seat and the front passenger seat. A vehicle can operate one or more applications (e.g., on the center console). The one or more applications can include one or more of a navigation app, a music app, a radio app, a vehicle settings app, a vehicle status app (e.g., that provides alerts of various vehicle statuses), a phone app, a texting app, etc. In some embodiments, the vehicle (e.g., the terminal of the vehicle) comprises an app or function for interfacing with a mobile terminal such as a user's mobile device. The one or more apps can be installed in the on-board device to provide users with different services. The one or more apps support functions for voice interactions with the user. For example, an app that supports functions for voice interactions can obtain an input corresponding to a voice command and perform an operation in response to the voice command such as configuring a route in a navigation app, playing a particular song (e.g., based on song name, performer, album, etc.), communicating with a contact (e.g., place an outgoing phone call, or text message, etc.), configure a setting of the vehicle, querying for weather information, stock information, or other network information, control of a vehicle (e.g., open/close the vehicle sunroof), query fuel consumption, mileage, and/or other vehicle information, etc. The one or more apps can also support touch interaction modes with the user (e.g., via a touch screen of the vehicle). For example, the one or more apps can perform a response operation in response to a touch input such as taps executed by a user on interfaces displayed by the one or more apps, such as configuring a route in a navigation app, playing a particular song (e.g., based on song name, performer, album, etc.), communicating with a contact (e.g., place an outgoing phone call, or text message, etc.), configuring a setting of the vehicle, querying for weather information, stock information, or other network information, control of a vehicle (e.g., open/close the vehicle sunroof), query fuel consumption, mileage, and/or other vehicle information, etc.

According to various embodiments, the one or more apps are loaded into the on-board device (e.g., a terminal of the vehicle). Thus, in the process of an interaction between the one or more apps and a user (e.g., driver or passenger of the vehicle), content can be displayed on the display screen of the on-board device. The user can interface with the one or more apps via a touch input to the screen (e.g., to the information displayed on the screen). However, the distances between seats in the vehicle and the on-board device will vary (e.g., the distance between the user and the terminal can vary). Therefore, a touch operation for a user who is located a relatively greater distance from the on-board device may be inconvenient to the user. Moreover, interaction with the one or more apps via touch input is distracting for the driver. For example, even if the distance of the driver's seat from the on-board device is relatively short, the touch interactive processes will distract the driver while the driver is driving the vehicle, thereby resulting in driving safety problems.

Various embodiments provide a solution to the interaction with the one or more apps via a touch input by predefining various response voice command modes (referred to below as response modes). The various response modes can be mapped to various locations in the vehicle (e.g., the response modes are mapped to the various seating positions in the vehicle). According to various embodiments, the difference in response modes is in connection with the mechanism by which the user interacts with the terminal. In response to a user in a particular location in the vehicle (e.g., in a particular seating position) inputting (e.g., triggering) a voice command, the on-board device uses the position of the user as a basis to determine the response mode corresponding thereto and adopts the response mode in connection with responding to the voice command. In response to obtaining a voice command, the response operation performed by the terminal is based at least in part on the location of the user (e.g., within the vehicle).

In some embodiments, the position of a user within a vehicle can be determined based at least in part on one or more thresholds. For example, the area within a vehicle is divided into a plurality of zones (or areas). A position (e.g., a seat) is mapped to one or more of the plurality of zones of the vehicle. In some embodiments, each position is mapped to a single one of the plurality of zones in the vehicle. The positions within the vehicle can be differentiated (e.g., mapped) into three types according to whether the distance between each seat in the vehicle and the on-board device exceeds a preset distance (e.g., an operable range) of the on-board device interface and/or according to a seat attribute: driver position (e.g., driver's position), a front passenger position (e.g., non-driver position and located within the operable range of the on-board device interface), and other positions (e.g., generally referred to as back-row positions or non-driver positions and located outside the operable range of the on-board device interface).

As an example, in the case of a vehicle capable of seating five persons, the vehicle generally includes one driver position and one front passenger position, which are in the front row, and back-row positions (e.g., three seats in the back-row).

Various positions and types of positions can be defined with respect to a vehicle. For example, the types of positions described above are merely examples. A vehicle can have a plurality of rows of passenger seats. For example, in the case of a vehicle being a minivan, the vehicle comprises a driver seat, a front-passenger seat, a first row of passenger seats, and a second row of passenger seats. As another example, in the case of a vehicle being a bus, the vehicle comprises several rows of passenger seats. In some embodiments, each of the positions (e.g., seat positions) can be mapped to a zone of the vehicle and/or to a mode (e.g., an operation mode such as a response mode) of the terminal for the vehicle.

According to various embodiments, various response modes differ based at least in part on user interaction logic. In some embodiments, the various response modes differ primarily on the user interaction logic or mechanism by which the user interfaces with the terminal. Differences in the interaction logic are based at least in part on a number of interactions and a mode of interaction. The term "number of interactions" can refer to the number of interactions between the user and the terminal after the terminal obtains the voice command from the user but before a final response is outputted corresponding to the voice command. For example, the term "number of interactions" corresponds to a total number of interactions required for the terminal to provide a result to comply with a preference of the user or for a total number of interactions required for the terminal to provide an output corresponding to the voice command. The term "mode of interaction" can refer to the mechanism by which the user interfaces with the terminal. For example, the mode of interaction corresponds to a voice input mode, a touch input mode, or mode by which an input is input via another mechanism (e.g., a keyboard, a mouse, etc.). In some embodiments, the mode of interaction comprises a plurality of mechanisms by which the user inputs an input to the terminal (e.g., a mode in which the terminal obtains an input via one or more of a voice command, a touch input, etc.).

Various benefits for a terminal (e.g., a vehicle) to be configured to have various response modes based at least in part on a context of the terminal (e.g., characteristics of the driving environment) include driving safety, user convenience for various users or users in various positions in relation to the terminal (e.g., seat position in a vehicle), etc. For example, a mode of interaction that obtains an input via a voice command and/or provides a response via a sound output (e.g., a voice output) facilitates driving safety when a driver is driving a vehicle. For example, a corresponding response mode can be configured (e.g., defined) to reduce the number of interactions for a corresponding user input. The response mode can be configured to maximize concision to avoid touch interactions on the interface to the extent possible and thereby reduce disturbance to the driving process (e.g., reduce the disturbance to the focus of the driver of the vehicle). In the case of a user in the front passenger position, the user is relatively close to the on-board device (e.g., within a threshold distance of the on-board device) and the user has a relatively greater ability to focus the user's attention on the on-board device (e.g., the user can view information being displayed on a screen of the terminal, etc.). As an example, in this case of the user in the front passenger position, the response mode is characterized by one or more voice interactions and/or one or more touch interactions so as to help the user in the front passenger position to more accurately find the necessary response content. In other words, the user in the front passenger position can interface with the terminal via a voice command and/or a touch input. In addition, the user in the front passenger position can interact with the terminal via a relatively larger number of interactions in connection with obtaining a response operation (e.g., because the front passenger is not driving the vehicle and thus the front passenger can interface with the terminal for a relatively longer time than the driver could while ensuring driving safety). In contrast, in the case of users in back-row positions (e.g., for passengers that are greater than a threshold distance from a terminal or a screen of the terminal, and/or for passengers that sit in rows behind the driver), such users are farther from the on-board device and cannot easily engage in touch interactions on the interface displayed by the on-board device. As an example, in this case of users in back-row positions, the users interface with the terminal via a voice interaction mode (e.g., the users speak voice commands that are obtained by the terminal). In the case of the user being determined to be the driver, the response mode can be characterized by providing one or more voice interactions with the user if the vehicle is determined to be traveling at a speed greater than (or greater than or equal to) a preset threshold, and can provide an output via a display or a voice command, and/or receive a user input via a touch input or a voice command if the vehicle is determined to be traveling at a speed less than the preset threshold (e.g., if the vehicle is determined to be parked or stopped).

According to various embodiments, a response mode of the terminal (e.g., of the on-board device of a vehicle) is based at least in part on a context of the vehicle (e.g., one or more characteristics of the driving environment) and/or a distance between the terminal and the user interfacing with the terminal (e.g., one or more distance characteristics of different positions within the vehicle relative to the on-board device). A response operation can be determined based at least in part on a context of the vehicle and/or a distance between the terminal and the user interfacing with the terminal. For example, a mode for outputting a response operation is determined based at least in part on a context of the vehicle and/or a distance between the terminal and the user interfacing with the terminal. The terminal can display an output responsive to a user request or speak an output responsive to the user request via one or more speakers in the vehicle. Various response modes corresponding to different positions of a user in a terminal can be selected and services can be accordingly provided in a targeted manner to users in different positions in the vehicle.

In some embodiments, if a user in a vehicle is triggering (e.g., inputting) a voice command during the actual driving process (e.g., while the vehicle is in motion and/or while the vehicle is being operated), then in response to the terminal (e.g., the on-board device of the terminal) receiving the voice command input by the user, the terminal determines a position corresponding to a location where the voice command was input (e.g., a position of the user). For example, the terminal performs sound source positioning processing with respect to the voice command in connection with determining the sound source position corresponding to the voice command (e.g., the position of the user in the vehicle). After determining a position corresponding to the location at which the voice command was input, the terminal determines the response mode corresponding to such a position (e.g., the sound source position). As an example, the terminal determines the response mode based at least in part on a preset mapping between various positions in the vehicle and various response modes. The terminal adopts the determined response mode (e.g., the response mode determined based on the mapping of positions to response modes), and the terminal performs a corresponding response operation. For example, the terminal responds to the voice command by outputting the response result. The response result can be output via an I/O interface (e.g., sound, display on a graphical user interface, etc.) corresponding to the response mode.

If a plurality of users are in a vehicle at the same time, at least a subset of the plurality of users may converse with each other. The terminal can monitor the sound of the vehicle, including the conversation between at least the subset of the plurality of users. The terminal can determine whether a voice command is input based on an analysis of the sound input to the terminal. For example, the terminal determines whether the monitored sound comprises a predefined command. The terminal can analyze the sound in real-time. As an example, the terminal obtains sound (e.g., voice commands), converts the sound to text via a speech-to-text processing, and determines whether a text corresponding to the sound matches any predefined commands. If any piece of speech is recognized as a voice command, the processing resources of the on-board device will be wasted. Accordingly, in some embodiments, the terminal performs sound source positioning only in response to detecting a valid voice command (e.g., in response to determining that the sound comprises a predefined command).

In some embodiments, in response to detecting an input to wake-up the terminal (e.g., a valid wake-up phrase, etc.) and detecting a voice input after waking up (e.g., detecting speech shortly after detecting the valid wake-up phrase), the terminal (e.g., an on-board device of the vehicle) uses the voice input as a voice command (e.g., a valid voice command for which the terminal determines to perform a response operation). For example, the terminal regards speech detected after detecting the wake-up phrase as a valid voice command. The wake-up phrase refers to a phrase or other input that is input (e.g., spoken) in connection with use of a particular app. The wake-up phrase can be a phrase other than input that is input to launch a corresponding app. For example, if an app is called "AAA," the wake-up phrase can correspond to: "Hello, AAA."

In some embodiments, in response to detecting a particular piece of speech (e.g., in response to determining that a sound input or voice input is obtained), the terminal (e.g., an on-board device of the vehicle) uses a preset keyword database as a basis for determining whether the speech comprises a keyword in the keyword data bank. For example, the terminal determines whether the sound input or voice input comprises a word mapped to a voice command. In response to determining that the piece of speech comprises a keyword in the keyword data bank, the terminal then determines that the piece of speech corresponds to a valid voice command (e.g., the terminal regards the speech as a valid voice command). According to various embodiments, the keywords in the keyword database comprise names, name synonyms, or other descriptions of service functions provided by corresponding apps. For example, the keywords mapped to an app correspond to keywords that are descriptive of the services provided by the app.

In some embodiments, determining a position (e.g., sound source position) corresponding to a location where the voice command was input (e.g., a position of the user) comprises obtaining a sound input via a voice input device such as a microphone that is configured at a predefined location relative to the terminal (e.g., a predefined location of the vehicle). For example, a voice input device is configured at each seat of the vehicle or at a predefined set of seats of the vehicle. Thus, if the user at a particular seat inputs a voice command as described above through the voice input device at the corresponding seat, preset associations between the voice input device and the location within the vehicle at which the voice input device is installed (e.g., installation positions such as the seat in the vehicle) serve as a basis to determine the installation position corresponding to the current voice input device (e.g., a location in the vehicle in which the voice input device is installed) and to determine the corresponding installation position as the sound source position corresponding to the voice command. In some embodiments, the input is detected at a plurality of voice input devices installed at various locations within the terminal. The voice input device for which the input is determined to be input can be the voice input device that obtains the input at a highest volume, or a degree of clarity of the detected voice input. In some embodiments, one or more characteristics of the voice input are used in connection with determining the voice input device to be used for determining the sound source position. The voice command received by the terminal can include an identifier identifying or otherwise indicating the corresponding voice input device. For example, in response to detecting a voice input, the voice input device can provide the terminal with information corresponding to the voice input and configure the information with a header or other package identifying the voice input device that is providing the terminal with such information. If the voice command received by the terminal includes an identifier corresponding to the voice input device, the terminal can determine the voice input device from which the voice command was obtained and thus determine the corresponding sound source position (e.g., based on a mapping of voice input devices to positions).

In some embodiments, the determining a position (e.g., a sound source position) corresponding to a location where the voice command was input (e.g., a position of the user) comprises obtaining a sound input via a plurality of voice input devices (e.g., an array of voice input devices) such as microphones that are configured at each seat of the vehicle or at a predefined set of seats of the vehicle. The determining the position (e.g., sound source position) corresponding to a location where the voice command was input can be based at least in part on a time difference of arrival positioning process, a microphone array-based sound source positioning process, or other such process. The microphone array can be configured at the terminal.

In some embodiments, in response to determining the position (e.g., sound source position) corresponding to a location where the voice command was input, the determining the response mode corresponding to the position comprises determining the response mode based on a mapping of positions to response modes. The mapping of positions to response modes can be stored locally at the terminal. The determining the response mode based on a mapping of positions to response modes comprises performing a look up of the response mode corresponding to the position of the location where the voice command was input.

In some embodiments, in response to determining the position (e.g., sound source position) corresponding to a location where the voice command was input, the determining the response mode corresponding to the position comprises determining that the sound source position is the driver position of the vehicle. The response mode corresponding to the driver position comprises: a mode in which a response result for the voice command is output directly. For example, the response mode corresponding to the driver position performs a response operation without requesting additional inputs from the user with respect to the voice command. As an example, the output of the response result directly corresponds to a response mode for which the number of interactions is zero. The response result can be output as an audio sound (e.g., via speakers in the vehicle).

In some embodiments, in response to determining the position (e.g., sound source position) corresponding to a location where the voice command was input, the determining the response mode corresponding to the position comprises determining that the sound source position corresponds to the front passenger position. The response mode corresponding to the front passenger position comprises: a mode in which a response result for the voice command is output in response to one or more further interactions between the user and the terminal. The one or more further interactions between the user and the terminal can be performed in a voice interaction mode and/or in a touch interaction mode. For example, the response mode corresponding to the front passenger position is configured to obtain an input (e.g., an interaction with a user) via a touch input to a screen of the console, etc., and/or a voice input. In response to the one or more further interactions, the response result corresponding to the voice command is output based at least in part on the one or more further interactions. As an example, the one or more further interactions are used in connection with further determining the response operation or the information requested in connection with the voice command. As an example, the response mode for the front passenger position corresponds to a response mode for which the number of interactions is one or more, and the one or more further interactions are obtained via a voice input or a touch input.

In some embodiments, in response to determining the position (e.g., sound source position) corresponding to a location where the voice command was input, the determining the response mode corresponding to the position comprises determining that the sound source position corresponds to a position other than the driver position or front passenger position (e.g., back-row position). The response mode corresponding to the front passenger position comprises: a mode in which a response result for the voice command is output in response to one or more further interactions between the user and the terminal. The one or more further interactions are performed in a voice interaction mode. For example, the response mode corresponding to the position other than the driver position or front passenger position is configured to obtain an input (e.g., an interaction with a user) via a voice input. In some embodiments, the response mode corresponding to the position other than the driver position or front passenger position does not receive the one or more further interactions via a touch input mode because the users in such positions are not within reach of the terminal (e.g., the console of the vehicle). In response to the one or more further interactions, the response result corresponding to the voice command is output based at least in part on the one or more further interactions. As an example, the one or more further interactions are used in connection with further determining the response operation or the information requested in connection with the voice command. As an example, the response mode for the position other than the driver position or front passenger position corresponds to a response mode for which the number of interactions is one or more, and the one or more further interactions are obtained via only a voice input.

In other words, if the voice command is triggered by the driver, the final response result is output directly in response to the voice command. If the voice command is triggered by the user in the front passenger position, the final response result can be output after multiple voice and touch interactions with the user. If the voice command is triggered by a user in a back-row position, the final response result can be output after multiple voice interactions with the user.

As an example, in a case of a voice command corresponding to a query regarding a navigation route from Location A to Location B, if the voice command is determined to have been triggered by the driver, a navigation route from Location A to Location B is directly output and appears on the display screen of the on-board device. In contrast, if the voice command is triggered by a front passenger or back-row user, one or more further interactions can be performed with the user in different corresponding interaction modes in order to output a navigation route from Location A to Location B, based on the interaction results with the user (e.g., based on the one or more further interactions), that appears on the display screen of the on-board device. The one or more further interactions can be used in connection with further refining/defining the desired information that is responsive to the voice command. For example, the one or more further interactions can comprise the terminal providing a list of options that are determined based at least in part on the voice command, the user inputting a selection of at least one of the list of options, or providing information used to configure a response operation.

In some embodiments, the process for performing an interaction between the terminal and user is the same for a front passenger and a back-row user. For example, the interaction logic for determining the response operation (e.g., for providing the information responsive to the voice command) is the same. The terminal can provide a final response (e.g., information responsive to the voice command) to the front passenger or the back-row user after at least one interaction with the user in a voice interaction mode. However, as described above, the distance from the on-board device to the front passenger user differs from the distance to the back-row users. Therefore, the front passenger user can conveniently view the content displayed on the display screen of the on-board device and easily perform touch operations on the content displayed on the display screen. The users in the back row, however, cannot easily have a clear view of the display screen and cannot easily perform touch operations. Therefore, the specific characteristics of the front passenger position versus the back-row positions can be taken into account so that, even if the terminal is configured to be able to interact with the user in the voice interaction mode for both the back-row and front-passenger positions, the specific voice interactions between the terminal and the user can differ. Differences between the voice interactions between the terminal and a front passenger and the voice interactions between the terminal and a back-row passenger are described below.

In some embodiments, in response to determining that the sound source position corresponds to the front passenger position, the terminal configures a mode according to which the response operation is performed (e.g., the response result is provided) in further response to at least one interaction conducted in a voice interaction mode and/or in a touch interaction mode. The response operation (e.g., the response result) is determined based at least in part on the at least one interaction via the voice interaction mode and/or the touch interaction mode. For example, the response operation can be determined based at least in part on the voice command (e.g., the initial voice input) and at least one interaction via the voice interaction mode and/or the touch interaction mode.

In some embodiments, in the case of the adoption of a mode according to which the response operation is performed (e.g., the response result is provided) in further response to at least one interaction conducted in a voice interaction mode and/or in a touch interaction mode, the process for responding to the voice command includes obtaining a plurality of response options corresponding to the voice command and outputting information pertaining to at least a subset of the plurality of response options. For example, the outputting the information pertaining to at least a subset of the plurality of response options includes displaying on an interface option information corresponding to at least a subset of the plurality of response options. As another example, the outputting the information pertaining to at least a subset of the plurality of response options includes outputting speech (e.g., audio) corresponding to at least a subset of the plurality of response options. The process for responding to the voice command further includes obtaining an input with respect to at least one of the at least the subset of the plurality of response options. For example, the terminal obtains one or more further interactions with respect to at least the subset of the plurality of response options. The process for responding to the voice command further includes performing a response operation in response to at least the input with respect to at least one of the at least the subset of the plurality of response options. For example, the terminal performs an operation in response to the one or more further interactions (e.g., speech directed at a response option, a selection operation directed at the option information, etc.). The at least the subset of the plurality of response options that are displayed on the interface can be selected based at least in part on a number of the plurality of response options and a number of response options that can be displayed on the interface at a particular time. For example, the space to display the response options on the interface can be limited and insufficient to display all of the plurality of response options. The at least the subset of the plurality of response options that are displayed on the interface can be selected based at least in part on user preferences, a priority of the response options, etc.

Figure 3:
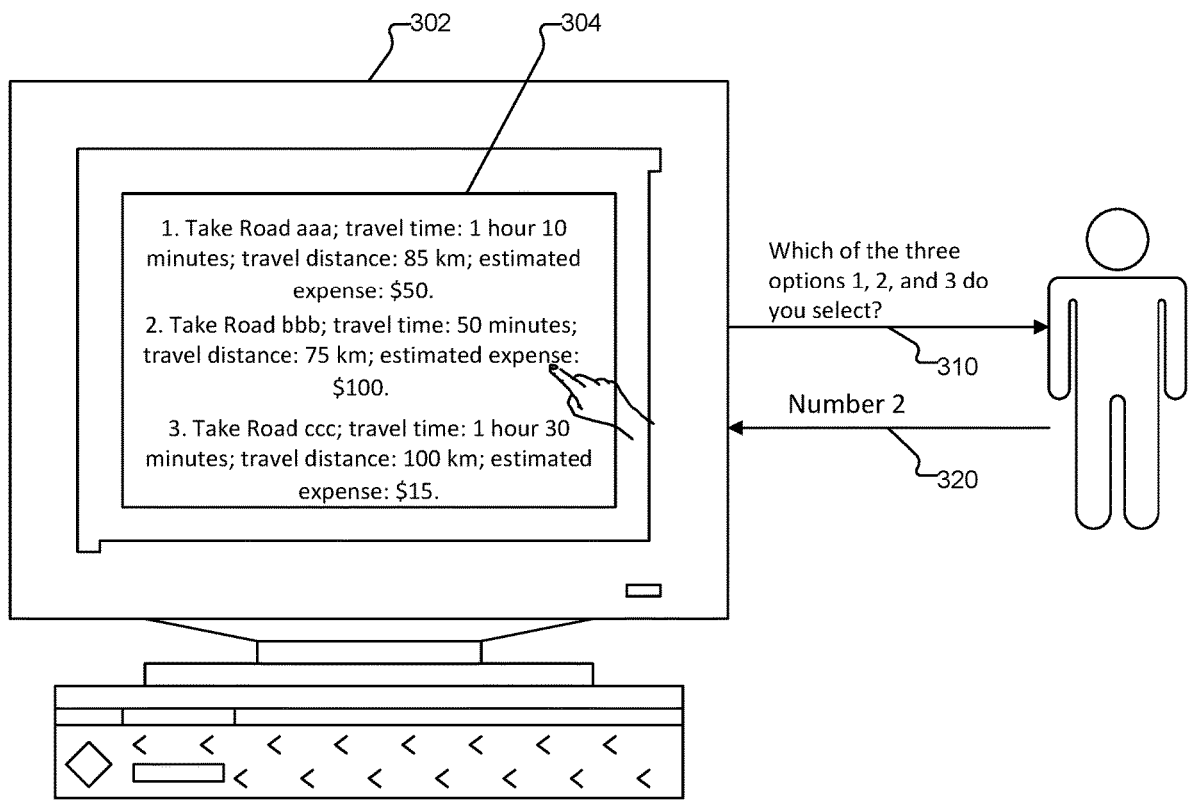
FIG. 3 is a diagram of an interaction process according to various embodiments of the present application.

FIG. 3 is a diagram of an interaction process according to various embodiments of the present application.

Referring to FIG. 3, process 300 for interacting with a terminal is provided. Process 300 can be implemented in connection with process 100 of FIG. 1, process 200 of FIG. 2, process 400 of FIG. 4, process 500 of FIG. 5, process 600 of FIG. 6, and/or process 700 of FIG. 7. Process 300 can implement execution process 800 of FIG. 8. Process 300 can be implemented at least in part by operating system 900 of FIG. 9 and/or computer system 1000 of FIG. 10.

As illustrated in FIG. 3, a user can interact with terminal 302. In response to a voice command, terminal 302 obtains a plurality of response options and/or information pertaining to the plurality of response options. Terminal 302 can provide information pertaining to at least a subset of the plurality of response options. For example, terminal 302 displays information pertaining to at least a subset of the plurality of response options on a screen 304. As illustrated in FIG. 3, in the case of a voice command associated with a request for navigation information or to launch a navigation app, terminal 302 provides information pertaining to three response options. In some embodiments, in response to a voice command corresponding to a query about the navigation route from Location A to Location B, terminal 302 provides a plurality of options on screen 304 (e.g., "take road aaa," "take road bbb," and "take road ccc"). Terminal 302 can further provide information pertaining to the plurality of options.

In some embodiments, information pertaining to the plurality of options (e.g., option information comprised in each navigation route option) can include an identifier (e.g., a numerical label) and route feature information (such as travel time, travel distance, key road sections, and estimated expense) corresponding to each navigation route. Thus, the following options interface may be displayed on the display screen 304 of terminal 302:

1. Take Road aaa; travel time: 1 hour 10 minutes; travel distance: 85 km; estimated expense: $50.

2. Take Road bbb; travel time: 50 minutes; travel distance: 75 km; estimated expense: $100.

3. Take Road ccc; travel time: 1 hour 30 minutes; travel distance: 100 km; estimated expense: $15.

In some embodiments, in addition to providing the information pertaining to at least a subset of the plurality of response options, terminal 302 can provide a prompt. For example, the prompt can be a prompt to the user with respect to selection of at least one of the plurality of response options, etc. The prompt can be provided by output speech 310 (e.g., called "query speech") such as "Which of the three options 1, 2, and 3 do you select?" If, in response to the prompt 310, the user provides an input 320, terminal 302 determines the response option corresponding to the input, determines the corresponding response operation, and performs the corresponding response operation. For example, input 320 can correspond to response speech "number 2." In response to input 320, terminal 302 provides (e.g., displays) the navigation route corresponding to option number 2 on the display screen 304. In some embodiments, input 320 can be input by the user via a touch input such as to screen 304.

For example, the user can select the desired option among three options displayed on the interface (e.g., tapping option number 2).

According to various embodiments, in connection with interactions with the front passenger user performed in a voice interaction mode and/or a touch interaction mode, the interactive speech conducted with the front passenger user can be more concise because the user is more likely to have a clear view of the interface content on the display screen. Accordingly, the query (e.g., the prompt for selection of the response option) requires less description information than a query to a passenger in a back-row would require. For example, the query to the front passenger user can be limited to asking the user to choose an option number. Further, in connection with performing a response operation, a front passenger user can select the option number or provide a touch input to the selected response option.

In some embodiments, in response to determining the position (e.g., sound source position) corresponding to a location where the voice command was input, the determining the response mode corresponding to the position comprises determining that the sound source position corresponds to the front passenger position. The determined response mode can be selected and/or implemented by the terminal. The response mode corresponding to the front passenger position can comprise a mode in which in response to at least one further interaction performed in a touch interaction mode, a response result is output according to the interaction result. For example, the response mode corresponding to the front passenger position is a mode that provides a response option to the user and performs a corresponding response operation in response to selection of a response option via a touch input by the user. If the response mode corresponds to a mode in which a response result is output based at least in part on at least one further interaction via a touch interaction mode, the response process for responding to the voice command can comprise: obtaining a plurality of response options corresponding to the voice command and outputting information pertaining to at least a subset of the plurality of response options. For example, the outputting the information pertaining to at least a subset of the plurality of response options includes displaying on an interface option information corresponding to at least a subset of the plurality of response options. As another example, the outputting the information pertaining to at least a subset of the plurality of response options includes outputting speech (e.g., audio) corresponding to at least a subset of the plurality of response options. The process for responding to the voice command further includes obtaining an input with respect to at least one of the at least the subset of the plurality of response options. For example, the terminal obtains one or more further interactions with respect to at least the subset of the plurality of response options. The one or more further interactions can comprise a touch input directed to the response option to be selected (e.g., a touch input directed to the option information displayed with respect to the response option). The process for responding to the voice command further includes performing a response operation in response to at least the input with respect to at least one of the at least the subset of the plurality of response options.

Figure 4:
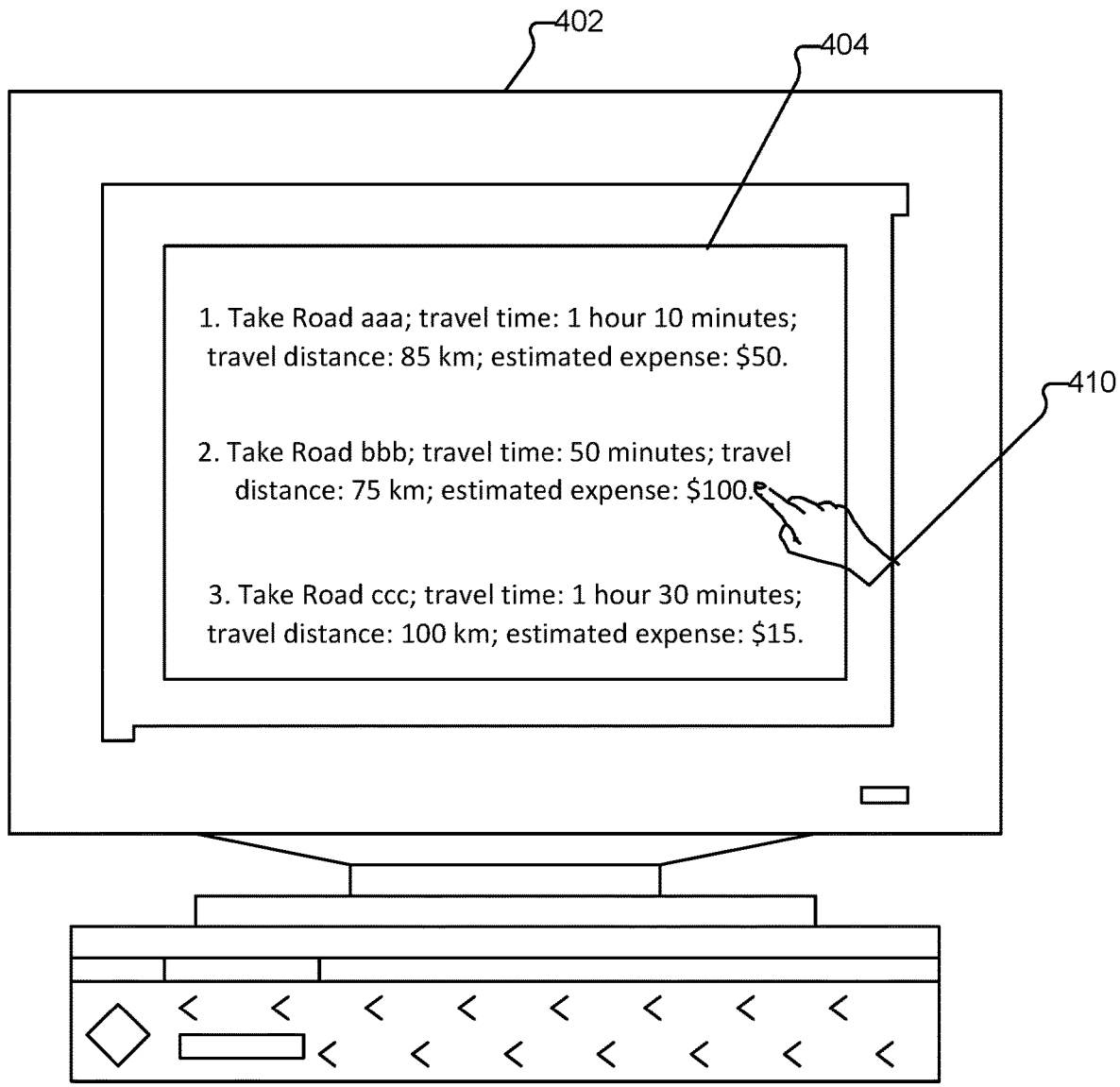
FIG. 4 is a diagram of an interaction process according to various embodiments of the present application.

FIG. 4 is a diagram of an interaction process according to various embodiments of the present application.

Referring to FIG. 4, process 400 for interacting with a terminal is provided. Process 400 can be implemented in connection with process 100 of FIG. 1, process 200 of FIG. 2, process 300 of FIG. 3, process 500 of FIG. 5, process 600 of FIG. 6, and/or process 700 of FIG. 7. Process 400 can implement execution process 800 of FIG. 8. Process 400 can be implemented at least in part by operating system 900 of FIG. 9 and/or computer system 1000 of FIG. 10.

As illustrated in FIG. 4, a user can interact with terminal 402. In response to a voice command, terminal 402 obtains a plurality of response options and/or information pertaining to the plurality of response options. Terminal 402 can provide information pertaining to at least a subset of the plurality of response options. For example, terminal 402 displays information pertaining to at least a subset of the plurality of response options on a screen 404. As illustrated in FIG. 4, in the case of a voice command associated with a request for navigation information or to launch a navigation app, terminal 402 provides information pertaining to three response options. In some embodiments, in response to a voice command corresponding to a query about the navigation route from Location A to Location B, terminal 402 provides a plurality of options on screen 404 (e.g., "take road aaa," "take road bbb," and "take road ccc"). Terminal 402 can further provide information pertaining to the plurality of options.

According to various embodiments, a user provides an input with respect to at least one of the at least the subset of the plurality of response options on a screen 404. At 410, the user provides a touch input to terminal 402 (e.g., to screen 404) to select at least one of the at least the subset of the plurality of response options. In response to the user performing a selection operation (e.g., a tap with respect to a response option), terminal 402 performs a response operation based at least in part on the voice command and the touch input (e.g., the selection of the response option). For example, terminal 402 provides a navigation route corresponding to the selected response option.

In some embodiments, in response to determining the position (e.g., sound source position) corresponding to a location where the voice command was input, the determining the response mode corresponding to the position comprises determining that the sound source position corresponds to the back-row passenger position. The determined response mode can be selected and/or implemented by the terminal. The response mode corresponding to the back-row passenger position can comprise a mode in which in response to at least one further interaction performed in a voice interaction mode (e.g., the at least one further interaction is a voice input), a response result is output based at least in part on the interaction result (e.g., based at least in part on the at least one further interaction). In some embodiments, in response to determining the position (e.g., sound source position) corresponding to a location where the voice command was input, the determining the response mode corresponding to the position comprises determining that the sound source position corresponds to the front passenger position. The determined response mode can be selected and/or implemented by the terminal. The response mode corresponding to the front passenger position can comprise a mode in which in response to at least one further interaction performed in a voice interaction mode (e.g., the at least one further interaction is a voice input), a response result is output based at least in part on the interaction result. If the response mode corresponds to a mode in which a response result is output based at least in part on at least one further interaction via a voice interaction mode, the response process for responding to the voice command can comprise: obtaining a plurality of response options corresponding to the voice command, and outputting information pertaining to at least a subset of the plurality of response options. For example, the outputting the information pertaining to at least a subset of the plurality of response options includes outputting speech (or other audio sounds) corresponding to the subset of the plurality of response options. The process for responding to the voice command further includes obtaining an input with respect to at least one of the at least the subset of the plurality of response options. For example, the terminal obtains one or more further interactions with respect to at least the subset of the plurality of response options. The one or more further interactions can comprise a touch input directed to the response option to be selected (e.g., a touch input directed to the option information displayed with respect to the response option), or a voice input with respect to at least one of the plurality of response options. The process for responding to the voice command further includes performing a response operation in response to at least the input with respect to at least one of the at least the subset of the plurality of response options.

Figure 5:
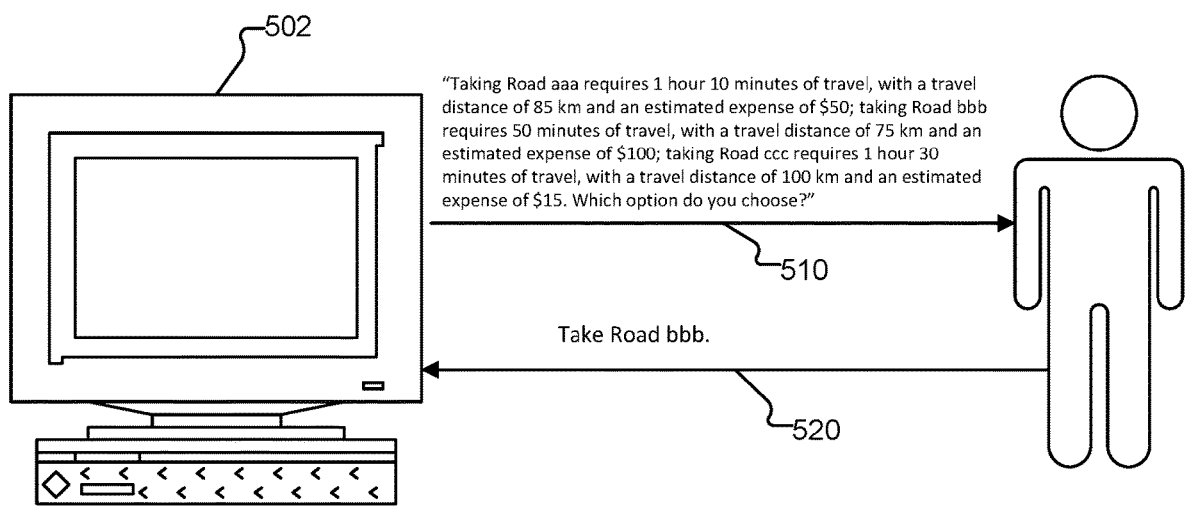
FIG. 5 is a diagram of an interaction process according to various embodiments of the present application.

FIG. 5 is a diagram of an interaction process according to various embodiments of the present application.

Referring to FIG. 5, process 500 for interacting with a terminal is provided. Process 500 can be implemented in connection with process 100 of FIG. 1, process 200 of FIG. 2, process 300 of FIG. 3, process 400 of FIG. 4, process 600 of FIG. 6, and/or process 700 of FIG. 7. Process 500 can implement execution process 800 of FIG. 8. Process 500 can be implemented at least in part by operating system 900 of FIG. 9 and/or computer system 1000 of FIG. 10.

As illustrated in FIG. 5, a user can interact with terminal 502. In response to a voice command, terminal 502 obtains a plurality of response options and/or information pertaining to the plurality of response options. Terminal 502 can provide information pertaining to at least a subset of the plurality of response options. For example, terminal 502 provides audio output pertaining to at least a subset of the plurality of response options. The audio output can comprise information describing the at least a subset of the plurality of response options. For example, the audio output can comprise information identifying one or more of the plurality of response options and/or information comprising one or more characteristics corresponding to the one or more of the plurality of response options. In the context of a navigation app, the information comprising one or more characteristics corresponding to the one or more of the plurality of response options can correspond to route feature information (such as travel time, travel distance, key road sections, and estimated expense) corresponding to each navigation route.

As illustrated in FIG. 5, in the case of a voice command associated with a request for navigation information or to launch a navigation app, at 510, terminal 502 provides information pertaining to three response options. In some embodiments, in response to a voice command corresponding to a query about the navigation route from Location A to Location B, terminal 502 provides a plurality of options via an audio output such as a speech output. For example, the speech output identifies one or more response options and information pertaining to the one or more response options (e.g., information describing one or more characteristics of the one or more response options).

FIG. 5 illustrates the output of the one or more response options comprising three navigation route options corresponding to the at least the subset of the plurality of response options. The option information comprised in each navigation route option can correspond to route feature information (e.g., travel time, travel distance, key road sections, and estimated expense). The audio output can further comprise a prompt for the user to select at least one of the one or more response options. For example, terminal 502 can output speech asking for the user to select a response option. The audio output can correspond to "Taking Road aaa requires 1 hour 10 minutes of travel, with a travel distance of 85 km and an estimated expense of $50; taking Road bbb requires 50 minutes of travel, with a travel distance of 75 km and an estimated expense of $100; taking Road ccc requires 1 hour 30 minutes of travel, with a travel distance of 100 km and an estimated expense of $15." At 520, the user provides a voice input to terminal 502 to select at least one of the one or more response options. In response to the user performing a selection operation (e.g., a voice input with respect to a response option), terminal 502 performs a response operation based at least in part on the voice command and the voice input (e.g., the selection of the response option). For example, terminal 502 provides a navigation route corresponding to the selected response option. If the user inputs speech "Take road bbb" after the terminal provides the audio output pertaining to the one or more response options, terminal 502 displays on the display screen the navigation route corresponding to the response option associated with the voice input selection by the user.

According to various embodiments, voice interactions with a user in a back-row passenger position of a vehicle enable the terminal to provide a more refined or more useful response to an initial voice command. However, because the user is relatively far from the terminal (e.g., a console or display screen in the vehicle), the user is generally not able to directly view on the interface the various response options that are provided in response to the voice command (e.g., the initial voice command). Accordingly, the various response options can be provided to the user via a voice mode (e.g., an audio output) and the terminal can further interact with the user to enable the user to make a selection of a desired response option via a voice interaction (e.g., a voice input).

In a vehicle application context, various embodiments provide different response modes that are configured for different sound source positions (e.g., different seating positions). Accordingly, response modes corresponding to the various positions of users can be selected for interaction with a user. The interaction with the user can adapt to changes in the position of the user by selecting a response mode corresponding to a current position of the user. The user can trigger (e.g., input) a voice command and the terminal can provide that user with targeted voice interaction services.

Figure 6:
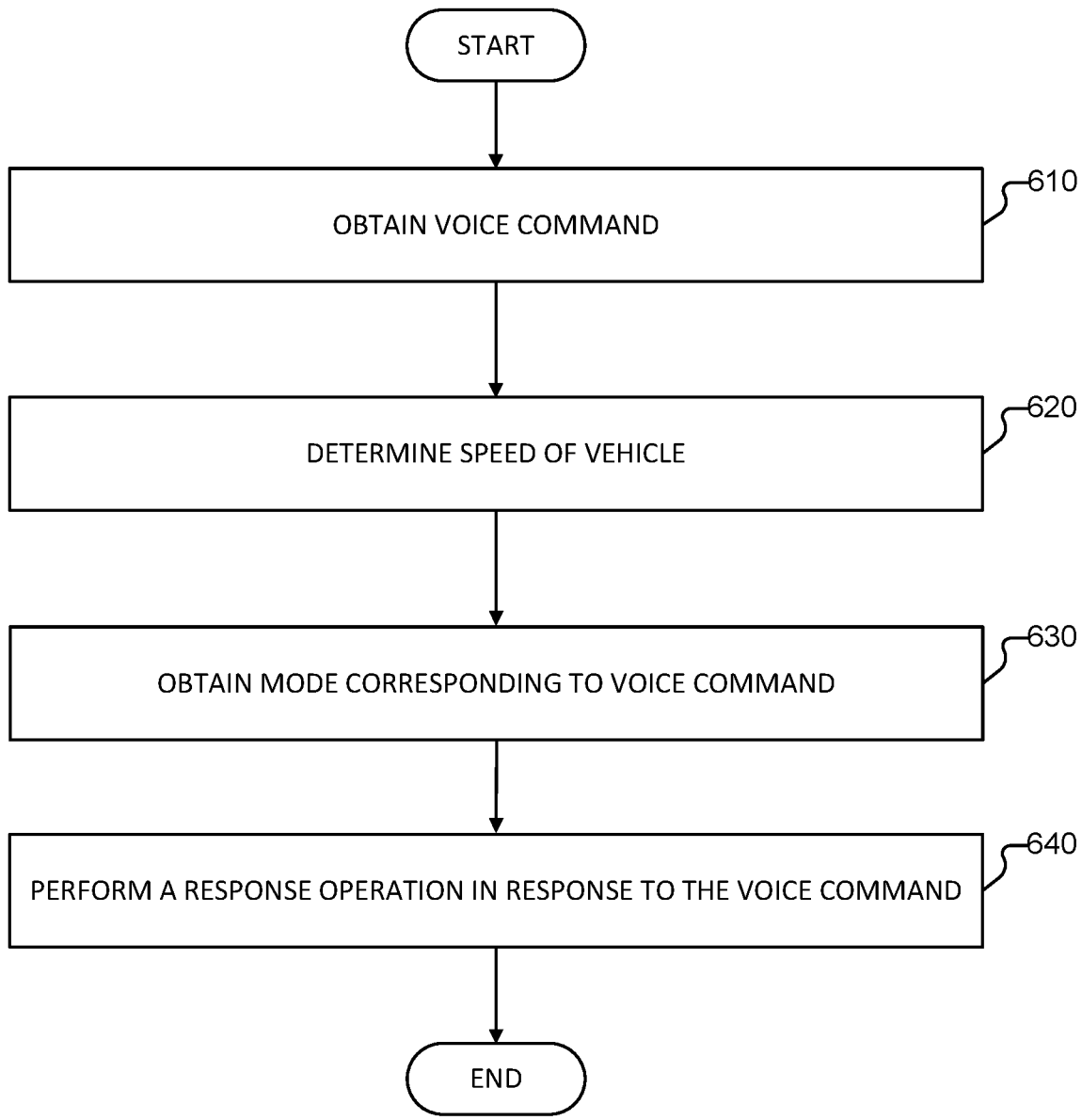
FIG. 6 is a flowchart of a method for interacting with a terminal according to various embodiments of the present application.

FIG. 6 is a flowchart of a method for interacting with a terminal according to various embodiments of the present application.

Referring to FIG. 6, process 600 for interacting with a terminal is provided. Process 600 can be implemented in connection with process 100 of FIG. 1, process 200 of FIG. 2, process 300 of FIG. 3, process 400 of FIG. 4, process 500 of FIG. 5, and/or process 700 of FIG. 7. Process 600 can implement execution process 800 of FIG. 8. Process 600 can be implemented at least in part by operating system 900 of FIG. 9 and/or computer system 1000 of FIG. 10.

At 610, a voice command is obtained. In some embodiments, the voice command is obtained by one or more microphones, etc. that are connected to a terminal such as the vehicle. The voice command can be obtained by a mobile terminal that is connected to the vehicle (e.g., via Bluetooth, USB, etc.) and the voice command can be provided by the mobile terminal to the vehicle (e.g., a computer operating the vehicle, a vehicle console, etc.). In response to receiving the voice command, the voice command can be converted to text information. For example, speech-to-text processing is performed with respect to the voice command to obtain text information corresponding to the voice command. Digital signal processing can be performed on the voice command before the speech-to-text processing in order to remove or reduce noise in the information corresponding to the voice command.

At 620, a speed of a vehicle is determined. For example, the speed of travel of the vehicle associated with the terminal is determined. The speed of the vehicle is obtained in response to determining that a voice command is obtained. The speed of the vehicle can be determined based at least in part on an output of one or more sensors on the vehicle. For example, the information used to provide the speed information on a speedometer of a vehicle is used to determine the speed of the vehicle.

At 630, a mode corresponding to the voice command is determined. In some embodiments, the terminal (e.g., a console or computer of a vehicle) determines the mode corresponding to the voice command (e.g., a response mode). The mode corresponding to the voice command can be determined based at least in part on the speed of the vehicle at the time that a voice command is obtained.

According to various embodiments, the mode corresponding to the voice command is determined based at least in part on a mapping of speeds (or ranges of speeds) to modes. For example, the terminal uses the determined vehicle speed corresponding to the voice command in connection with performing a look up in the mapping to determine the mode corresponding to the vehicle speed.

At 640, a response operation is performed. In some embodiments, in response to obtaining the voice command and/or determining the mode, the terminal (e.g., a terminal of the vehicle such as a console of the vehicle) performs a response operation. In some embodiments, the response operation comprises adopting a mode corresponding to the location corresponding to the voice command and/or context information. The response operation can include performing one or more functions such as one or more functions that are responsive to the voice command. In some embodiments, the response operation comprises adopting a mode corresponding to the location corresponding to the voice command and/or context information (e.g., a response mode), and thereafter performing one or more functions such as one or more functions that are responsive to the voice command. The response operation can comprise providing information to the user such as via a graphical user interface, or a voice response. The information provided to the user is based at least in part on the voice command and/or the context information corresponding to the voice command. In some embodiments, the response operation comprises setting or modifying one or more characteristics of the vehicle. The performing the response operation can comprise performing one or more further interactions with a user (e.g., to refine and/or further narrow the response option desired by the user).

In the context of a vehicle application context for the purpose of explanation, the mode of responding to a voice command triggered by a user can be determined based at least in part on the travel speed of the vehicle.

In some embodiments, the travel speed of the vehicle is obtained when a voice command triggered by a user is received. For example, in response to obtaining the voice command, the terminal determines the speed of the vehicle.

In some embodiments, if the speed of the vehicle is less than a preset threshold value, the obtaining the mode corresponding to the voice command comprises obtaining a mode in response to at least one further interaction performed in a voice interaction mode (e.g., the at least one further interaction is a voice input) and/or a touch interaction mode (e.g., the at least one further interaction is a touch input). The response result is output based at least in part on the interaction result (e.g., based at least in part on the at least one further interaction). In some embodiments, in response to determining the speed of the vehicle corresponding to the voice command, the determining the response mode corresponding to the position comprises determining a response mode mapped to the speed and/or speed range in which the speed of the vehicle falls. The determined response mode can be selected and/or implemented by the terminal.

In some embodiments, if the speed of the vehicle is greater than or equal to a preset threshold value, the obtaining the mode corresponding to the voice command comprises obtaining a mode in which a response result (or response operation) for the voice command is output directly. For example, in the response mode corresponding to a speed higher than a preset threshold value, the system performs a response operation without requesting additional inputs from the user with respect to the voice command. The response mode according to which a response result is output directly can correspond to a speed that is relatively high (e.g., a speed indicative of the vehicle traveling on a freeway). As an example, the output of the response result directly corresponds to a response mode for which the number of interactions is zero. The response result can be output as an audio sound (e.g., via speakers in the vehicle).

In some embodiments, if the speed of the vehicle is indicative of the vehicle accelerating and decelerating at a frequency greater than a preset threshold (e.g., indicative of the vehicle being in stop-and-go traffic), the obtaining the mode corresponding to the voice command comprises obtaining a mode in which a response result (or response operation) for the voice command is output directly. For example, the response mode corresponding to stop-and-go traffic performs a response operation without requesting additional inputs from the user with respect to the voice command. As an example, the output of the response result directly corresponds to a response mode for which the number of interactions is zero. The response result can be output as an audio sound (e.g., via speakers in the vehicle).

In some embodiments, the preset threshold value is set at 0, which is the equivalent of dividing the travel status of the vehicle into the two statuses of moving and still. Of course, the preset value may be a numerical value greater than 0.

Various preset threshold values can be set for various response modes. For example, a first threshold can be indicative of the vehicle being stopped or parked, a second threshold can be indicative of the vehicle moving slowly (e.g., less than 20 mph), a third threshold can be indicative of the vehicle moving on a city road (e.g., greater than 20 mph and less than 55 mph), and a fourth threshold value can be indicative of the vehicle moving on a freeway (e.g., greater than 55 mph). Other threshold values can be implemented (e.g., for various other contexts).

In some embodiments, if the travel speed is less than a preset threshold value, the response result output is based at least in part on the interaction result corresponding to at least one further interaction conducted in a voice interaction mode and refers to the response result finally output for the user through the process of voice questions and answers between the terminal and the user. For example, the terminal prompts the user for one or more voice inputs to select one or more response options or desired properties of the response result (e.g., to narrow or refine the result options).

In some embodiments, if the travel speed is less than a threshold preset value, the response result is output based at least in part on one or more further interactions (e.g., an interaction result based on at least one interaction) conducted in a touch interaction mode. The response output based at least in part on the one or more further interactions can refer to the intermediate status response information obtained by the terminal based at least in part on the received voice command. The intermediate status response information can be presented (e.g., displayed) on an interface, and a user can perform a touch operation (e.g., a touch input such as a tapping or swiping on the interface) with respect to at least part of the intermediate status response information. The intermediate status response information can comprise one or more response options (e.g., options from which a user can select a desired response to the voice command). In response to a touch operation to the interface (e.g., by the user), such as to at least part of the intermediate status response information, the terminal can provide another interface. The other interface can provide a response that is responsive to the voice command. For example, the other interface can provide a response result to the user based at least in part on the one or more further interactions (e.g., one or more touch interactions).

In some embodiments, in response to a determination that the speed of the vehicle is less than a preset threshold value, the terminal determines to use a response mode according to which a response operation is performed based at least in part on one or more further interactions in a touch interaction mode and/or a voice interaction mode.

Figure 7:
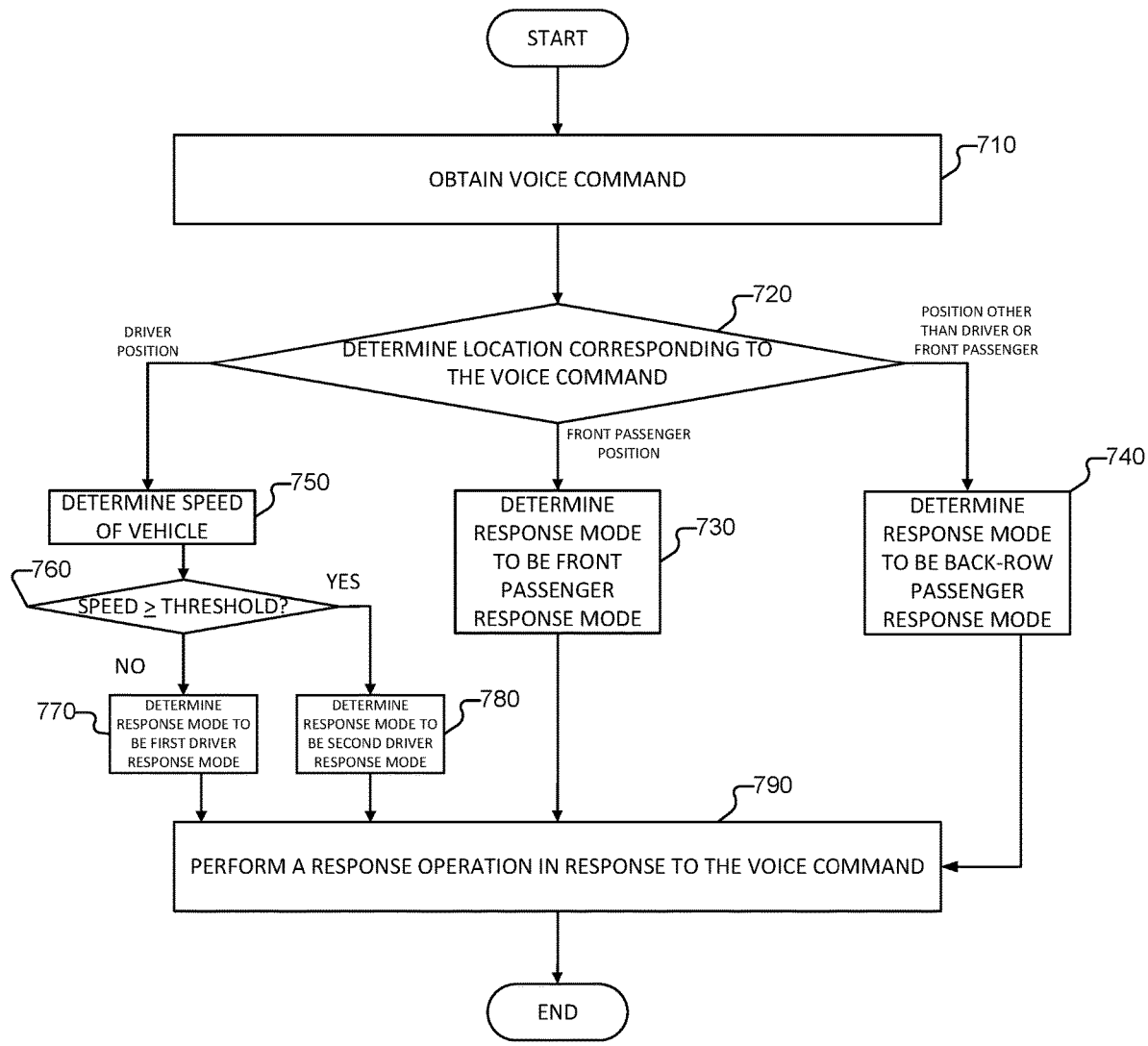
FIG. 7 is a flowchart of a method for interacting with a terminal according to various embodiments of the present application.

FIG. 7 is a flowchart of a method for interacting with a terminal according to various embodiments of the present application.

Referring to FIG. 7, process 700 for interacting with a terminal is provided. Process 700 can be implemented in connection with process 100 of FIG. 1, process 200 of FIG. 2, process 300 of FIG. 3, process 400 of FIG. 4, process 500 of FIG. 5, and/or process 600 of FIG. 6. Process 700 can implement execution process 800 of FIG. 8. Process 700 can be implemented at least in part by operating system 900 of FIG. 9 and/or computer system 1000 of FIG. 10.

At 710, a voice command is obtained. In some embodiments, the voice command is obtained by one or more microphones, etc. that are connected to a terminal such as the vehicle. The voice command can be obtained by a mobile terminal that is connected to the vehicle (e.g., via Bluetooth, USB, etc.) and the voice command can be provided by the mobile terminal to the vehicle (e.g., a computer operating the vehicle, a vehicle console, etc.). In response to receiving the voice command, the voice command can be converted to text information. For example, speech-to-text processing is performed with respect to the voice command to obtain text information corresponding to the voice command. Digital signal processing can be performed on the voice command before the speech-to-text processing in order to remove or reduce noise in the information corresponding to the voice command.

At 720, a location corresponding to the voice command is obtained. In some embodiments, the terminal determines the location corresponding to the voice command. As an example, the location corresponding to the voice command is the relative location from which the voice command is input (e.g., the location at which the user speaks the voice command) in relation to one or more sensors in the terminal. As another example, the location corresponding to the voice command is an absolute location from which the voice command is input (e.g., the backseat of a vehicle, the passenger seat of a vehicle, etc.). In some embodiments, the terminal determines the location corresponding to the voice command based at least in part on a digital signal processing of the signal corresponding to the voice command. As an example, the location corresponding to the voice command is determined based at least in part on a volume of the voice command. As an example, the location corresponding to the voice command is determined based at least in part on a comparative analysis of using a plurality of inputs corresponding to the voice command, the plurality of voice inputs being respectively received at different sensors such as microphones connected to the terminal (e.g., triangulation of the location).

At 730, a response mode corresponding to a front passenger response mode is determined. According to various embodiments, in response to determining that the location corresponding to the voice command is the front passenger position, the terminal determines the response mode (e.g., for responding to the voice command) to be the front passenger response mode. In some embodiments, the front passenger response mode corresponds to a mode according to which a response operation is performed (e.g., a response to the voice command is provided) in response to one or more further interactions. The one or more further interactions of the front passenger response mode can be provided (e.g., input/output) according to a touch interaction mode and/or a voice interaction mode. The response operation is based at least in part on the one or more further interactions. For example, the response operation is based at least on the voice command and the one or more further interactions. In response to determining that the response mode corresponds to the front passenger response mode, process 700 proceeds to 790.

At 740, a response mode corresponding to a back-row passenger response mode is determined. According to various embodiments, in response to determining that the location corresponding to the voice command is a position other than the driver or front passenger, the terminal determines the response mode (e.g., for responding to the voice command) to be the back-row passenger response mode. In some embodiments, the back-row passenger response mode corresponds to a mode according to which a response operation is performed (e.g., a response to the voice command is provided) in response to one or more further interactions. The one or more further interactions of the back-row passenger response mode can be provided (e.g., input/output) according to a voice interaction mode. The response operation is based at least in part on the one or more further interactions. For example, the response operation is based at least on the voice command and the one or more further interactions. In response to determining that the response mode corresponds to the back-row passenger response mode, process 700 proceeds to 790.

At 750, a speed of a vehicle is determined. According to various embodiments, in response to determining that the location corresponding to the voice command is a driver position, the terminal determines the speed of travel at which the vehicle associated with the terminal is determined. The speed of the vehicle can be determined based at least in part on an output of one or more sensors on the vehicle. For example, the information used to provide the speed information on a speedometer of a vehicle is used to determine the speed of the vehicle.

At 760, the terminal determines whether the speed of the vehicle is greater than or equal to a threshold. For example, the terminal determines whether the speed of the vehicle is greater than or equal to a preset threshold value. In response to determining that the speed of the vehicle is not greater or equal to the threshold, process 700 proceeds to 770. In response to determining that the speed of the vehicle is greater than or equal to the threshold, process 700 proceeds to 780. In some embodiments, if the voice command is triggered by the driver, then the response mode is determined at least in part on the speed of the vehicle.

At 770, a response mode corresponding to a first driver response mode is determined. According to various embodiments, in response to determining that the voice command is triggered at the driver position (e.g., by the driver) and that the speed of the vehicle is not greater or equal to the threshold, the terminal determines the response mode (e.g., for responding to the voice command) to be the first driver response mode. In some embodiments, the first driver response mode corresponds to a mode according to which a response operation is performed (e.g., a response to the voice command is provided) in response to one or more further interactions. The one or more further interactions of the first driver response mode can be provided (e.g., input/output) according to a touch interaction mode and/or a voice interaction mode. The response operation is based at least in part on the one or more further interactions. For example, the response operation is based at least on the voice command and the one or more further interactions. In response to determining that the response mode corresponds to the first driver response mode, process 700 proceeds to 790.

At 780, a response mode corresponding to a second driver response mode is determined. According to various embodiments, in response to determining that the voice command is triggered at the driver position (e.g., by the driver) and that the speed of the vehicle is greater or equal to the threshold, the terminal determines the response mode (e.g., for responding to the voice command) to be the second driver response mode. In some embodiments, the second driver response mode corresponds to a mode according to which a response operation is performed (e.g., a response to the voice command is provided) directly in response to the voice command. In some embodiments, the second driver response mode corresponds to a mode according to which a response operation is performed in response to the voice command and not in response to one or more further interactions. The response mode corresponding to a speed higher than a preset threshold value performs a response operation without requesting additional inputs from the user with respect to the voice command. As an example, the output of the response result directly corresponds to a response mode for which the number of interactions is zero. The response result can be output as an audio sound (e.g., via speakers in the vehicle). In response to determining that the response mode corresponds to the second driver response mode, process 700 proceeds to 790.

At 790, a response operation is performed in response to the voice command. In some embodiments, in response to obtaining the voice command and/or obtaining the context information, the vehicle (e.g., a terminal of the vehicle such as a console of the vehicle) performs a response operation. In some embodiments, the response operation comprises adopting a mode corresponding to the context information. The response operation can include performing one or more functions such as one or more functions that are responsive to the voice command. In some embodiments, the response operation comprises adopting a mode corresponding to the context information (e.g., a response mode), and thereafter performing one or more functions such as one or more functions that are responsive to the voice command. The response operation can comprise providing information to the user such as via a graphical user interface, or a voice response. The information provided to the user is based at least in part on the voice command and/or the context information corresponding to the voice command. In some embodiments, the response operation comprises setting or modifying one or more characteristics of the vehicle.

According to various embodiments, the response operation is performed using the determined response mode (e.g., the response mode determined at 730, 740, 770, or 780, etc.).

According to various embodiments, in response to receiving a voice command triggered by a user, response to the voice command comprises: first—perform sound source positioning, and second—determine vehicle travel speed only if the sound source position is determined to correspond to the driver position, otherwise the response mode is determined based on the sound source position (e.g., the response mode corresponding to the front passenger, the back-row passenger, etc. without requiring the determination of the vehicle speed), and if the sound source position is determined to correspond to the driver position, then the speed of the vehicle is determined, and thereafter the mode for responding to the voice command triggered by the driver is determined based at least in part on the speed of the vehicle.

Figure 8:
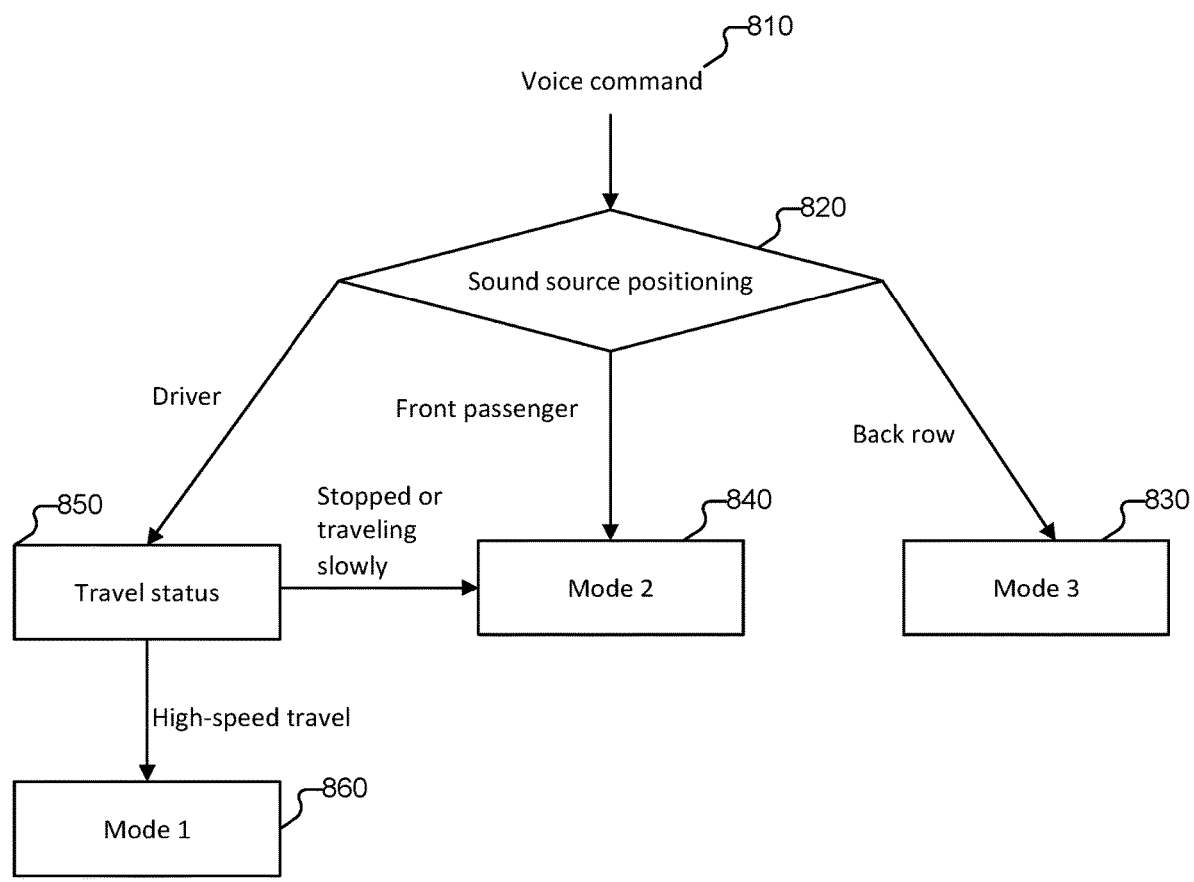
FIG. 8 is a diagram of an execution process according to various embodiments of the present application.

FIG. 8 is a diagram of an execution process according to various embodiments of the present application.

Referring to FIG. 8, process 800 for interacting with a terminal is provided. Process 800 can be implemented in connection with process 100 of FIG. 1, process 200 of FIG. 2, process 300 of FIG. 3, process 400 of FIG. 4, process 500 of FIG. 5, process 600 of FIG. 6, and/or process 700 of FIG. 7. Process 800 can be implemented at least in part by operating system 900 of FIG. 9 and/or computer system 1000 of FIG. 10.

In some embodiments, if the vehicle is traveling at a high speed, then mode 1 is adopted in connection with responding to a voice command input by a driver. Mode 1 is configured to ensure driving safety. For example, mode 1 corresponds to a mode of directly outputting the final response result. The purpose thereof is to prevent safety risks from arising during the driver-machine interaction process.

In some embodiments, if the vehicle is traveling at a high speed, then mode 1 is adopted in connection with responding to a voice command input by a driver. In some embodiments, if the vehicle is stopped or travels slowly (e.g., below a predefined speed threshold), then mode 2 is adopted in connection with responding to a voice command input by a driver. Mode 2 is configured to provide a response result in response to at least one further interaction conducted in a voice interaction mode and/or in a touch interaction mode. The use of mode 2 to provide a response to a voice command enables the terminal to provide a response result that more closely conforms to the driver's preference.

In some embodiments, if the sound source positioning result indicates that the sound source position corresponds to the front passenger position, then mode 2 is adopted in connection with responding to a voice command input by the front passenger. Mode 2 is configured to provide a response result in response to at least one further interaction conducted in a voice interaction mode and/or in a touch interaction mode.

In some embodiments, if the sound source position result indicates that the sound source position corresponds to a position other than the driver position or front passenger position, then mode 3 is adopted in connection with responding to a voice command input by a user in a position other than the driver position or front passenger position. Mode 3 is configured to provide a response result in response to at least one further interaction conducted in a voice interaction mode.

Thus, targeted, differentiated responses are given to voice commands triggered by users in different positions in the car based at least in part on the sound source positioning result and vehicle travel status. Attention is given to both driving safety and service targeting issues.

At 810, a voice command is obtained. In response to obtaining the voice command at 810, at 820, a sound source positioning process is performed in connection with determining a location (e.g., a position in the vehicle) from which the voice command is triggered (e.g., input). In response to determining that the voice command is triggered from a back-row position, at 830, mode 3 is implemented in connection with responding to the voice command. In response to determining that the voice command is triggered from the front passenger, at 840, mode 2 is implemented in connection with responding to the voice command. In response to determining that the voice command is triggered from the driver position at 820, at 850, the terminal determines a context of the vehicle such as a travel status (e.g., driving conditions, speed of the vehicle, whether the vehicle is parked, etc.). Based on the context of the vehicle, a corresponding mode is implemented in connection with responding to the voice command. For example, if the travel status corresponds to the vehicle being stopped or traveling slowly, mode 2 is implemented in connection with responding to the voice command. As another example, if the travel status corresponds to the vehicle traveling at a high speed (e.g., greater than a preset speed threshold), then mode 1 is implemented at 860 in connection with responding to the voice command.

Figure 9:
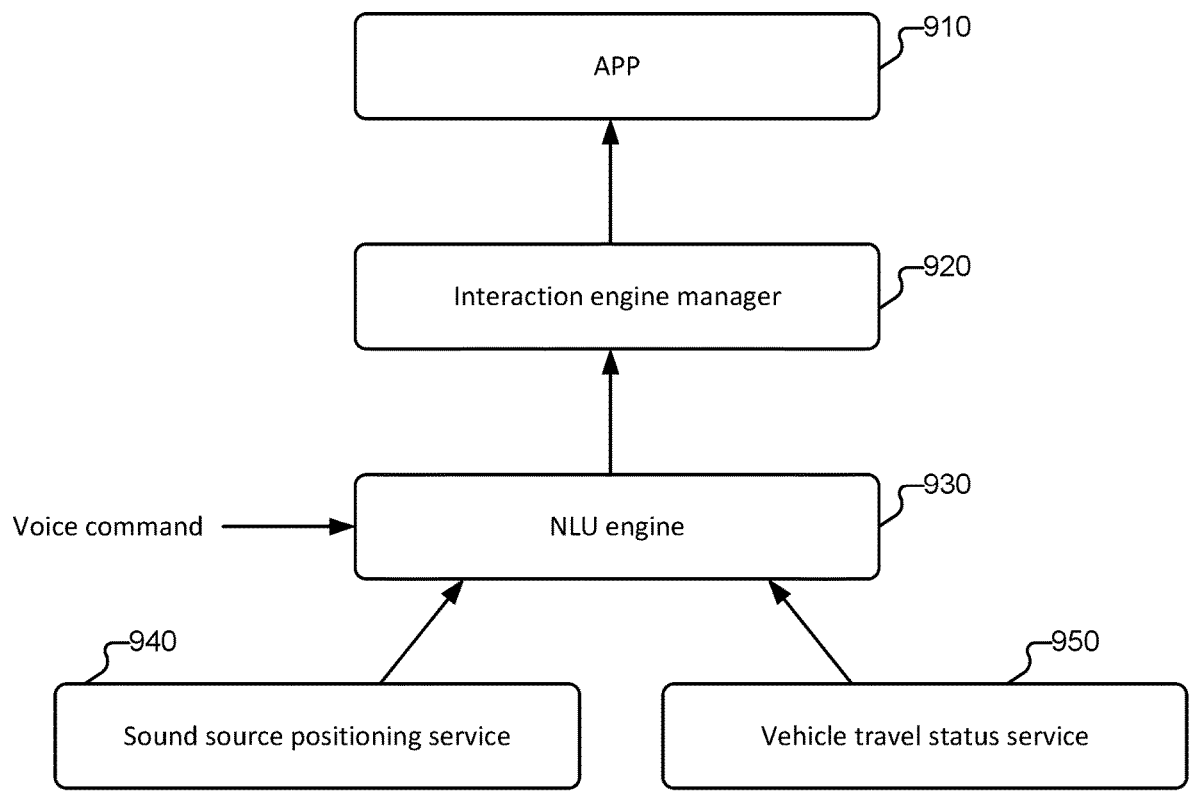
FIG. 9 is a diagram of an operating system according to various embodiments of the present application.

FIG. 9 is a diagram of an operating system according to various embodiments of the present application.

Referring to FIG. 9, operating system 900 is provided. Operating system 900 can implement at least part of process 100 of FIG. 1, process 200 of FIG. 2, process 300 of FIG. 3, process 400 of FIG. 4, process 500 of FIG. 5, process 600 of FIG. 6, process 700 of FIG. 7, and/or process 800 of FIG. 8. Operating system 900 can be implemented at least in part by computer system 1000 of FIG. 10.

The interaction method provided by each of the embodiments described above may be executed by an operating system in an electronic device such as an on-board device or a smart television. The operating principles of how the operating system executes the interaction modes are explained simply in light of FIG. 9. As shown in FIG. 9, when considered in terms of functional logic, the operating system can include an interaction engine manager 920, a natural language understanding (NLU) engine 930, a sound source positioning service 940, and a vehicle travel status service 950. The interaction engine manager 920 can be configured to control multiple interaction engines such as a view interaction engine and a voice interaction engine.

As illustrated in FIG. 9, the response object used to respond to user voice commands is an app 910. App 910 provides multiple response modes.

In the context of process 700 of FIG. 7 as an example, in response to NLU engine 930 receiving a voice command triggered by a user, the NLU engine 930 calls a sound source positioning service 940 to determine the sound source position (e.g., driver, front passenger, back row). NLU engine 930 can call a vehicle travel status service 950 to obtain the current vehicle travel status (e.g., driving conditions, speed, moving, still, parked, etc.). NLU engine 930 then communicates the voice command, sound source position, and vehicle travel status information (or information pertaining to the voice command, sound source position, and vehicle travel status information) to the interaction engine manager 920. Interaction engine manager 920 uses the sound source position and vehicle travel status as a basis to determine which response mode to adopt and notifies the app 910 to respond to the voice command in the determined response mode.

Figure 10:
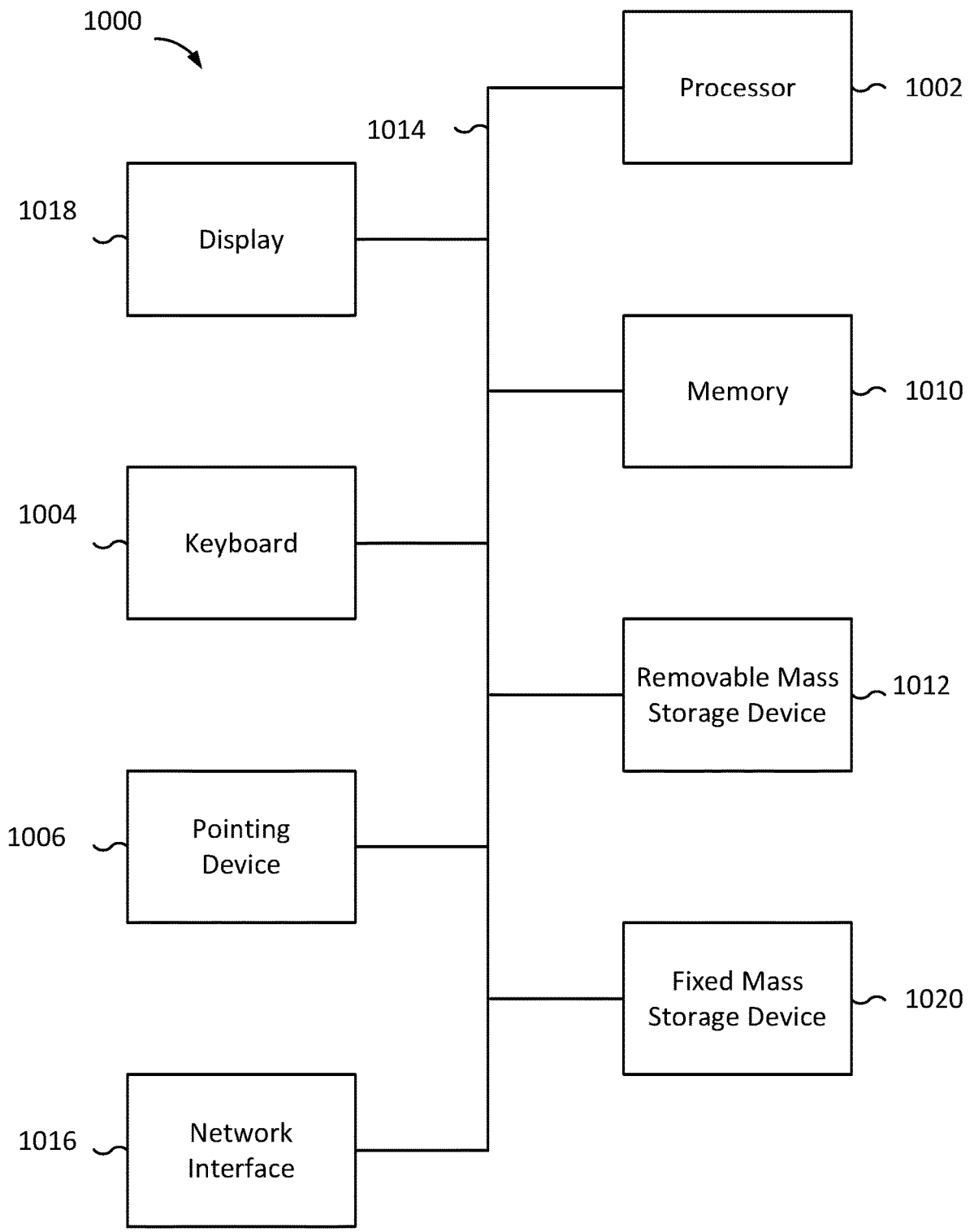
FIG. 10 is a functional diagram of a computer system according to various embodiments of the present application.

FIG. 10 is a functional diagram of a computer system according to various embodiments of the present application.

Referring to FIG. 10, computer system 1000 is provided. Computer system 1000 can implement at least part of process 100 of FIG. 1, process 200 of FIG. 2, process 300 of FIG. 3, process 400 of FIG. 4, process 500 of FIG. 5, process 600 of FIG. 6, process 700 of FIG. 7, process 800 of FIG. 8, and/or operating system 900 of FIG. 9.

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer-readable storage media, described below, depending on whether, for example, data access needs to be bi-directional or uni-directional. For example, processor 1002 can also directly and very rapidly retrieve and store frequently needed data in a cache memory (not shown). The memory can be a non-transitory computer-readable storage medium.

A removable mass storage device 1012 provides additional data storage capacity for the computer system 1000, and is coupled either bi-directionally (read/write) or uni-directionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storage device 1012 and fixed mass storage 1020 generally store additional programming instructions, data, and the like that typically are not in active use by the processor 1002. It will be appreciated that the information retained within mass storage device 1012 and fixed mass storage 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Through descriptions of the above implementations, persons skilled in the art can clearly understand that the implementations may be realized with the necessary general-use hardware platform. Of course, they may also be realized through combinations of hardware and software. On the basis of such an understanding, the technical scheme described above, whether essentially or in those parts that contribute to the prior art, may be embodied in the form of computer products. The present invention may take the form of one or more computer program products implemented on computer-usable storage media (including but not limited to magnetic disk memory, CD-ROM, and optical memory) containing computer-usable program code.

The present invention is described with reference to flow charts and/or block diagrams based on methods, equipment (systems) and computer program products of the present invention. Please note that each process and/or block within the flowcharts and/or block diagrams and combinations of processes and/or blocks within the flowcharts and/or block diagrams can be implemented by computer instructions. These computer program instructions can be provided to a general-purpose computer, a special-purpose computer, an embedded processor, or a processor of another voice interaction device to give rise to a machine, with the result that the instructions executed by the processor of the computer or other programmable voice interaction devices give rise to means used to implement the functions specified in one or more processes in a flowchart and/or in one or more blocks in a block diagram.

These computer program instructions can also be stored in computer-readable memory that can guide computers or other programmable voice interaction devices to operate according to specific modes, with the result that the instructions stored in this computer-readable memory give rise to products that include instruction means. These instruction means implement the functions specified in one or more processes in a flow chart and/or one or more blocks in a block diagram.

These computer program instructions can also be loaded onto a computer or other programmable voice interaction device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In a typical configuration, a computer device comprises one or more processors (CPUs), input/output ports, network interfaces, and memory.

Memory may include the following forms in computer-readable media: volatile memory, random-access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media do not include transitory computer-readable media (transitory media) such as modulated data signals and carrier waves.

The final point that should be explained is the following: the above embodiments only serve to explain the technical schemes of the present invention and not to limit it. Although the present invention was explained in detail with reference to the above-described embodiments, persons skilled in the art should understand that they may modify the technical schemes recorded in the various embodiments described above or provide equivalent substitutions for some of their technical features. Yet these modifications or substitutions do not cause the corresponding technical schemes to substantively depart from the spirit and scope of the technical schemes of the various embodiments of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by one or more processors of a terminal, a voice command from a user;
    determining, by the one or more processors, context information corresponding to the voice command, the determining the context information comprises:
        determining a position in a vehicle from which the voice command is input; and
        in response to a determination that the position from which the voice command is input corresponds to a driver position, determining a speed of a corresponding vehicle; and
    performing, by the one or more processors, a response operation in response to the voice command, wherein:
        the response operation is based at least in part on a response mode that is determined based at least in part on the context information;
        the response mode indicates one or more interfaces for interaction between the terminal and the user; and
        in response to a determination that the speed is greater than or equal to a preset threshold value, the response mode is determined to correspond to a mode according to which the response operation is performed directly with respect to the voice command.

2. The method of claim 1, wherein the response operation is configured based on one more interactions between the user and the terminal, the one or more interactions generate input or output according to the response mode corresponding to the context information.

3. The method of claim 1, wherein the context information comprises one or more of: a source of the voice command and status information corresponding to the terminal.

4. The method of claim 3, wherein the status information corresponding to the terminal comprises one or more of: a driving condition of the vehicle, the speed of the vehicle, an application that is being executed when the voice command is obtained, an application for which an interface is displayed on a console of the vehicle, and environmental conditions in which the vehicle is operating.

5. The method of claim 3, wherein the terminal is the vehicle or an on-board device in the vehicle, and the source of the voice command comprises a position in the vehicle from which the voice command is input.

6. The method of claim 5, wherein the position from which the voice command is input corresponds to the driver position of the vehicle, and the response mode comprises:
    a mode according to which a response result for the voice command is output directly.

7. The method of claim 5, wherein the position from which the voice command is input is a front passenger position, and the response mode comprises:
    a mode according to which one or more further interactions are performed with the user and a response result for the voice command is provided based at least in part on the one or more further interactions, the one or more being conducted in a voice interaction mode, a touch interaction mode, or both.

8. The method of claim 5, wherein the position from which the voice command is input is a position other than the driver position or a front passenger position, and the response mode comprises:
    a mode according to which one or more further interactions are performed with the user and a response result for the voice command is provided based at least in part on the one or more further interactions, the one or more further interactions being conducted in a voice interaction.

9. The method of claim 3, wherein the status information comprises a speed of the vehicle.

10. The method of claim 9, further comprising:
    determining that the speed of the vehicle is less than a preset threshold value; and
    in response to determining that the speed of the vehicle is less than the preset threshold value, the response mode is determined to correspond to a mode according to which the response operation is performed in response to one or more further interactions between the terminal and the user, the one or more further interactions performed in one or more of a voice interaction mode and a touch interaction mode.

11. The method of claim 1, wherein to perform the response operation directly with respect to the voice command comprises performing the response operation without regard to a further interaction between the terminal and the user.

12. The method of claim 1, wherein:
    in response to a determination that the speed is less than a preset threshold value, the response mode is is determined to correspond to a mode according to which the response operation is performed in response to one or more further interactions between the terminal and the user, and the one or more further interactions are performed in a voice interaction mode, a touch interaction mode, or both.

13. The method of claim 1, further comprising:
    determining the response mode, wherein the response mode is a mode according to which the response operation is performed in response to one or more further interactions between the terminal and the user, the one or more further interactions are performed in a voice interaction mode, a touch interaction mode, or both;
    obtaining a plurality of response options based at least in part on the voice command;
    providing to the user option information corresponding to at least a subset of the plurality of response options; and
    obtaining a user input with respect to at least one of the plurality of response options, wherein the response operation is determined based at least in part on the voice command and the user input with respect to at least one of the plurality of response options.

14. The method of claim 13, wherein the option information corresponding to at least the subset of the plurality of response options is provided based at least in part on displaying, on a screen, the option information corresponding to at least the subset of the plurality of response options.

15. The method of claim 13, wherein the option information corresponding to at least the subset of the plurality of response options is provided based at least in part on outputting speech corresponding to at least the subset of the plurality of response options.

16. The method of claim 13, further comprising:
performing one or more responsive actions in response to the user input with respect to the at least one of the plurality of response options.

17. A device, comprising:
one or more processors configured to:
obtain a voice command from a user;
determine context information corresponding to the voice command, to determine the context information comprises:
determining a position in a vehicle from which the voice command is input; and
in response to a determination that the position from which the voice command is input corresponds to a driver position, determining a speed of a corresponding vehicle; and
perform a response operation in response to the voice command, wherein:
the response operation is based at least in part on a response mode that is determined based at least in part on the context information;
the response mode indicates one or more interfaces for interaction between a terminal and the user; and
in response to a determination that the speed is greater than or equal to a preset threshold value, the response mode is determined to correspond to a mode according to which the response operation is performed directly with respect to the voice command; and
one or more memories coupled to the one or more processors, configured to provide the one or more processors with instructions.

18. The device of claim 17, wherein the device comprises a vehicle or an on-board device in a vehicle.

19. A computer program product, the computer program product being embodied in a non-transitory computer readable storage medium and comprising computer instructions for:
obtaining, by one or more processors of a terminal, a voice command from a user;
determining, by the one or more processors, context information corresponding to the voice command, the determining the context information comprises:
determining a position in a vehicle from which the voice command is input; and
in response to a determination that the position from which the voice command is input corresponds to a driver position, determining a speed of a corresponding vehicle; and
performing, by the one or more processors, a response operation in response to the voice command, wherein:
the response operation is based at least in part on a response mode that is determined based at least in part on the context information;
the response mode indicates one or more interfaces for interaction between the terminal and the user; and
in response to a determination that the speed is greater than or equal to a preset threshold value, the response mode is determined to correspond to a mode according to which the response operation is performed directly with respect to the voice command.

20. A method, comprising:
obtaining, by one or more processors of a terminal, a voice command from a user;
determining, by the one or more processors, context information corresponding to the voice command, the determining the context information comprises:
determining a position in a vehicle from which the voice command is input; and
in response to a determination that the position from which the voice command is input corresponds to a driver position, determining a speed of a corresponding vehicle; and
performing, by the one or more processors, a response operation in response to the voice command, wherein:
the response operation is based at least in part on a response mode that is determined based at least in part on the context information;
the response mode indicates one or more interfaces for interaction between the terminal and the user; and
in response to a determination that the speed is less than a preset threshold value, the response mode is determined to correspond to a mode according to which the response operation is performed in response to one or more further interactions between the terminal and the user, and the one or more further interactions are performed in a voice interaction mode, a touch interaction mode, or both.

21. A device, comprising:
one or more processors configured to:
obtain a voice command from a user;
determine context information corresponding to the voice command, to determine the context information comprises:
determining a position in a vehicle from which the voice command is input; and
in response to a determination that the position from which the voice command is input corresponds to a driver position, determining a speed of a corresponding vehicle; and
perform a response operation in response to the voice command, wherein:
the response operation is based at least in part on a response mode that is determined based at least in part on the context information;
the response mode indicates one or more interfaces for interaction between a terminal and the user; and
in response to a determination that the speed is less than a preset threshold value, the response mode is determined to correspond to a mode according to which the response operation is performed in response to one or more further interactions between the terminal and the user, and the one or more further interactions are performed in a voice interaction mode, a touch interaction mode, or both; and
one or more memories coupled to the one or more processors, configured to provide the one or more processors with instructions.

22. A computer program product, the computer program product being embodied in a non-transitory computer readable storage medium and comprising computer instructions for:
obtaining, by one or more processors of a terminal, a voice command from a user;

determining, by the one or more processors, context information corresponding to the voice command, the determining the context information comprises:
- determining a position in a vehicle from which the voice command is input; and
- in response to a determination that the position from which the voice command is input corresponds to a driver position, determining a speed of a corresponding vehicle; and performing, by the one or more processors, a response operation in response to the voice command, wherein:
- the response operation is based at least in part on a response mode that is determined based at least in part on the context information;
- the response mode indicates one or more interfaces for interaction between the terminal and the user; and
- in response to a determination that the speed is less than a preset threshold value, the response mode is determined to correspond to a mode according to which the response operation is performed in response to one or more further interactions between the terminal and the user, and the one or more further interactions are performed in a voice interaction mode, a touch interaction mode, or both.

* * * * *

UNITED STATES PATENT AND TRADEMARK OFFICE
CERTIFICATE OF CORRECTION

PATENT NO. : 11,264,026 B2
APPLICATION NO. : 16/549808
DATED : March 1, 2022
INVENTOR(S) : Liang Chen It is certified that error appears in the above-identified patent and that said Letters Patent is hereby corrected as shown below:

In the Claims

In Column 34, Line 03, Claim 12, after "mode" delete "is".

Signed and Sealed this
Fourth Day of October, 2022

Katherine Kelly Vidal
*Director of the United States Patent and Trademark Office*